(12) United States Patent
Takashima et al.

(10) Patent No.: US 11,196,874 B2
(45) Date of Patent: Dec. 7, 2021

(54) IMAGE PROCESSING DEVICE, IMAGE FORMING APPARATUS, IMAGE READING DEVICE, CONTROL METHOD, AND RECORDING MEDIUM

(71) Applicant: SHARP KABUSHIKI KAISHA, Sakai (JP)

(72) Inventors: Masahiko Takashima, Sakai (JP); Daisaku Imaizumi, Sakai (JP); Teruhiko Matsuoka, Sakai (JP); Yasushi Adachi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/839,833

(22) Filed: Apr. 3, 2020

(65) Prior Publication Data
US 2020/0336604 A1 Oct. 22, 2020

(30) Foreign Application Priority Data

Apr. 17, 2019 (JP) .............................. JP2019-078820

(51) Int. Cl.
*H04N 1/00* (2006.01)
(52) U.S. Cl.
CPC ..... *H04N 1/00034* (2013.01); *H04N 1/00005* (2013.01); *H04N 1/00408* (2013.01)
(58) Field of Classification Search
None
See application file for complete search history.

(56) References Cited

U.S. PATENT DOCUMENTS

| 6,078,680 A * | 6/2000 | Yoshida | G06K 9/6206 382/128 |
| 6,181,819 B1 * | 1/2001 | Arimoto | H04N 1/46 358/462 |
| 7,006,708 B1 * | 2/2006 | Nako | H04N 1/3935 382/294 |
| 9,185,264 B2 * | 11/2015 | Yoshida | H04N 1/4052 |
| 10,410,354 B1 * | 9/2019 | Feng | G06N 3/08 |
| 10,672,129 B1 * | 6/2020 | Yoo | G06N 3/0454 |
| 2005/0091372 A1 * | 4/2005 | Nagao | H04L 63/104 709/224 |
| 2005/0206912 A1 * | 9/2005 | Megawa | H04N 1/6072 358/1.1 |
| 2005/0275910 A1 * | 12/2005 | Hokoi | H04N 1/00092 358/518 |
| 2008/0003510 A1 * | 1/2008 | Harazaki | G03F 1/68 430/5 |

(Continued)

FOREIGN PATENT DOCUMENTS

| JP | 2007-266921 A | 10/2007 |
| JP | 4934015 B2 | 5/2012 |
| JP | 5763613 B2 | 8/2015 |

*Primary Examiner* — Anh-Vinh Thi Nguyen
(74) *Attorney, Agent, or Firm* — ScienBiziP, P.C.

(57) ABSTRACT

To provide an image processing device including a generator that generates output image data from input image data, a calculation processor that calculates an evaluation value indicating a degree of information loss of the output image data, a determiner that compares the evaluation value with a predetermined threshold value and determines a magnitude of the degree of information loss, and a display that displays information in accordance with a determination result by the determiner.

13 Claims, 15 Drawing Sheets

(56) References Cited

U.S. PATENT DOCUMENTS

| | | | |
|---|---|---|---|
| 2009/0160999 A1* | 6/2009 | Nishimura | H04N 5/2257 |
| | | | 348/345 |
| 2009/0161970 A1 | 6/2009 | Harada | |
| 2015/0139003 A1* | 5/2015 | Takahashi | H04W 24/10 |
| | | | 370/252 |
| 2015/0146020 A1* | 5/2015 | Imaizumi | H04N 19/17 |
| | | | 348/207.1 |
| 2016/0212645 A1* | 7/2016 | Uemura | H04W 24/08 |
| 2018/0032840 A1* | 2/2018 | Yu | G06T 7/11 |
| 2018/0137395 A1* | 5/2018 | Han | G06N 3/04 |
| 2019/0156154 A1* | 5/2019 | Tu | G06N 3/0454 |
| 2019/0279368 A1* | 9/2019 | Feng | G06T 7/11 |
| 2019/0303245 A1* | 10/2019 | Romanenko | G06F 11/1451 |
| 2019/0394438 A1* | 12/2019 | Okamoto | H04N 5/202 |
| 2020/0014820 A1* | 1/2020 | Imaizumi | H04N 1/407 |
| 2021/0012181 A1* | 1/2021 | Zhu | G06T 7/10 |
| 2021/0067659 A1* | 3/2021 | Mimura | H04N 1/00411 |
| 2021/0150279 A1* | 5/2021 | Dudzik | G06T 3/0093 |

\* cited by examiner

IMAGE PROCESSING DEVICE, IMAGE FORMING APPARATUS, IMAGE READING DEVICE, CONTROL METHOD, AND RECORDING MEDIUM

This Nonprovisional application claims priority under 35 U.S.C. § 119(a) on Patent Application No. 2019-078820 filed in Japan on 17 Apr. 2019, the entire contents of which are hereby incorporated by reference.

BACKGROUND OF THE INVENTION

Field of the Invention

The present invention relates to an image processing device, an image forming apparatus, an image reading device, a control method, and a recording medium.

Description of the Background Art

In recent years, digital image processing systems have achieved remarkable development, and the construction of a digital image processing technology is in progress. For example, in the fields of copying machines, multi-function printers (MFPs) using an electrophotographic system or an inkjet system, and the like, a document manuscript is read by a scanner and stored as a document file being electronic data, or the stored document file is managed. In addition, the document file is compressed and sent by e-mail.

Recently, the use of MFPs equipped with an automatic document feeder (ADF) is widespread. When a document to be read is set on the ADF, the document can be automatically conveyed to a scanner in a sequential manner, and images can be read one side by one side. This reduces a load on a user by resetting a side to be read on a platen each time a document is scanned.

On the other hand, when a plurality of documents are set on the ADF and read, then if documents with a mixture of different attributes are read with the same settings, low-quality reading results or excessively high-quality reading results may possibly be obtained in some of the documents. For example, when documents printed in full color and documents printed only in a monochrome binary mode are mixed, then if all the documents are read as monochrome binary images or grayscale images, the color information may be lost in the documents printed in full color, and thus, characters and photographs may appear blurred. Conversely, if a document having only characters printed in black color on a white base sheet is read in full color, originally unnecessary color information may be added, resulting in an enormous file size.

In view of the above situations, for example, there is disclosed an Auto Color Selection (ACS) technology for detecting the presence or absence of a color from a read image and switching processing according to the detection result.

There is disclosed another technology in which a mode for outputting a read image is determined from a monochrome binary mode, an 8-bit gray scale (256 gradations) mode, and the like if it is determined that the read image is a monochrome image having only achromatic colors without any chromatic colors.

For example, according to Japanese Patent No. 4934015 (hereinafter, referred to as "Patent Document 1"), a technology is disclosed for selecting whether to use first encoding processing corresponding to multilevel image data or second encoding processing corresponding to binary image data to encode images to be filed as monochrome images from among read images. According to the disclosed technology, it is possible for a user to display the images to be filed as monochrome images on a display in a list format, and to select, for each of the images specified through an inputter, whether to output as a monochrome binary image or as a grayscale image. Further, it is also possible to cause the image processing device to determine whether to output as a monochrome binary image or as a grayscale image, and thus, the user need not make a determination for each of the images. The image processing device selects either one of the first encoding processing or the second encoding processing, based on, for example, the data amount (that is, the file sizes) of each of the images after the encoding processing.

According to the Japanese Unexamined Patent Application Publication No. 2007-266921 (hereinafter, referred to as "Patent Document 2"), a method is disclosed by which whether to output a read image as a monochrome binary image or as a multilevel grayscale image is determined in accordance with a proportion of text data and photograph data in a document determined to be monochrome by ACS. According to this method, it is determined in advance whether to handle the document as a text document or as a photograph document according to the proportion of text data and photograph data in the document, and if the document is determined to be a text document, the data is converted into monochrome binary data, and if the document is determined to be a photograph document, the document is output in grayscale, and thus, it is possible to implement the output process corresponding flexibly to a usage purpose, and the like by a simple operation.

Further, according to Japanese Patent No. 5763613 (hereinafter, referred to as "Patent Document 3"), a method is disclosed in which a dialog box is displayed and asks a user whether to change a mode instructed by the user, instead of performing output processing as is if mode instruction information in which the user instructs whether to output a document in a color mode or in a monochrome mode does not match a result of automatic determination based on the image data of the document by an ACS of whether the document is in color or in monochrome. According to this method, if the ACS determination result is different from the user's intention, the display of the dialog box can notify the user of an inconsistency with the ACS determination result, and the user can be given an opportunity to correct the instruction if it is determined that the user has provided an incorrect instruction. Patent Document 3 also states that when the user's instruction does not match the ACS determination result, and the dialog box is displayed to ask the user to take an action, then if the user instructs an output according to his/her initial instruction contrary to the determination result of the ACS, it is assumed that there is an error in the determination by the ACS, and the threshold value of the ACS is adjusted. As a result, it is possible to respect the user's intention and adjust the determination criteria at the ACS side for each user.

The acceptable degree of information loss varies depending on a user. In particular, according to the method of automatically selecting the output mode as described in Patent Document 1 or 2, because a user cannot confirm which output mode has been selected until the user views the output file, it is necessary to perform the reading operation again if there is a problem in the image quality of the output file, which is troublesome.

Also, in the method described in Patent Document 3, it cannot be determined whether the user's own determination is correct until the out file is viewed. For example, even if both the user and the image processing device determine that the file must be output in monochrome, then there may be cases where even when some image quality problem actually occurs, the user is not notified through a dialog display and notices the image quality problem only after the out file is viewed.

Therefore, the present invention has been made in view of the above-described problems, and an object thereof is to provide an image processing device and the like capable of determining a magnitude of a degree of information loss of image data to be output, and displaying a determination result.

SUMMARY OF THE INVENTION

To resolve the above-described problems, an image processing device according to the present invention includes a generator that generates output image data from input image data, a calculation processor that calculates an evaluation value indicating a degree of information loss of the output image data, a determiner that compares the evaluation value with a predetermined threshold value and determines a magnitude of the degree of information loss, and a display that displays information according to a determination result by the determiner.

An image forming apparatus according to the present invention includes the image processing device described above, and an image forming device that forms images, based on image data processed and output by the image processing device.

An image reading device according to the present invention includes the image processing device described above, and an inputter that reads images and inputs the images as input image data.

A control method according to the present invention includes generating output image data from input image data, calculating an evaluation value indicating a degree of information loss of the output image data, comparing the evaluation value with a predetermined threshold value and determining a magnitude of the degree of information loss, and displaying information according to a determination result in the comparing and determining.

A computer program according to the present invention to execute functions of generating output image data from input image data, calculating an evaluation value indicating a degree of information loss of the output image data, comparing the evaluation value with a predetermined threshold value and determining a magnitude of the degree of information loss, and displaying information according to a determination result in the comparison and determination.

A recording medium according to the present invention is a computer-readable non-transitory recording medium in which the above-described computer program is recorded.

According to the present invention, it is possible to determine a magnitude of a degree of information loss of image data to be output, and display a determination result.

DESCRIPTION OF THE PREFERRED EMBODIMENTS

The present invention will be described below in detail with reference to drawings illustrating embodiments of the present invention. First, an image forming apparatus including an image processing device to which the present invention is applied will be described as an example, for the embodiments.

1. First Embodiment

1.1 Functional Configuration

In a first embodiment, an example in which an image processing device according to an embodiment of the present invention forms a part of an image forming apparatus 1 will be described.

Figure 1:
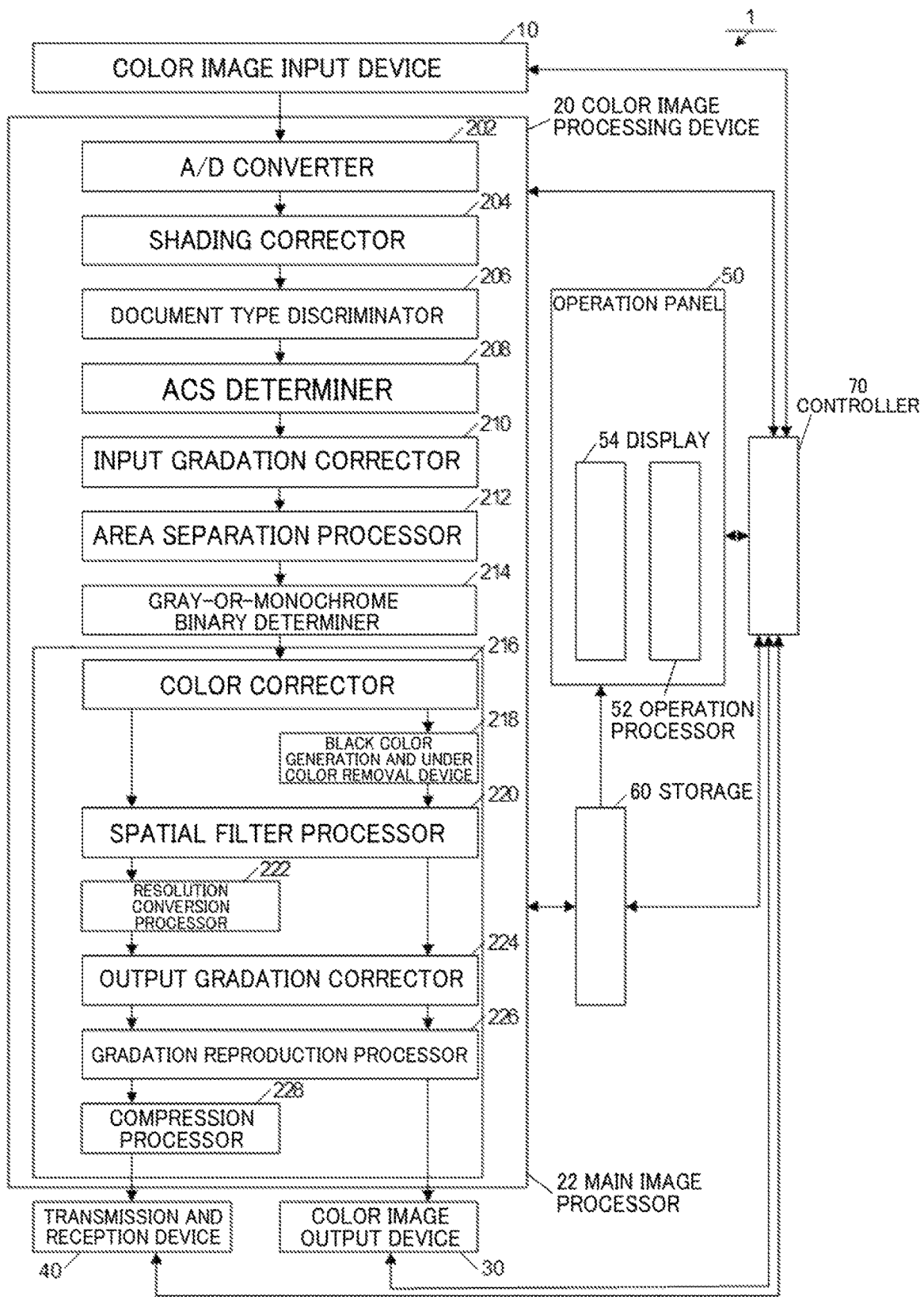
FIG. 1 is a diagram for explaining a functional configuration of an image forming apparatus according to a first embodiment.

FIG. 1 is a block diagram illustrating an internal functional configuration of the image forming apparatus 1 according to the first embodiment. The image forming apparatus 1 is a digital multifunctional apparatus having a color copying function, a color scanner function, and the like. As illustrated in FIG. 1, the image forming apparatus 1 includes a color image input device 10, a color image processing device 20, a color image output device 30, a transmission and reception device 40, an operation panel 50, a storage 60, and a controller 70.

Various processes executed in the image forming apparatus 1 are executed while the controller 70 controls the color image input device 10, the color image processing device 20, the color image output device 30, the transmission and reception device 40, the operation panel 50, and the storage 60. The controller 70 includes, for example, a Central Processing Unit (CPU). The controller 70 performs data communication with computers, other digital multifunctional apparatuses, and the like connected to a network via an unillustrated network card and LAN cable.

The color image input device 10 is a device that optically reads a color image from a document. The color image input device 10 is connected to the color image processing device 20 that processes image data of the read color image, and outputs the processed image data or generates a compressed file. The color image output device 30 that outputs a color image, based on the image data generated by the color image processing device 20, and the transmission and reception device 40 that transmits the compressed file generated by the color image processing device 20 to the outside is connected to the color image processing device 20.

Further, the storage 60 is connected to the color image processing device 20. The storage 60 is a functional element that stores various data such as image data and various programs, and includes, for example, a nonvolatile storage device (such as a hard disk).

Further, the controller 70 is connected to the operation panel 50. The operation panel 50 is provided with: an operation processor 52 including hard keys such as numeric keys and a setting button for setting an operation mode and the like of the image forming apparatus 1 by a user; and a display 54 including a device such as a liquid crystal display, or an organic EL display. The operation panel 50 may be a touch panel in which the operation processor 52 and the display 54 are integrally formed. In this case, a method of detecting an input on the touch panel may be a common detection method such as a resistive method, touch screen technology utilizing infrared or electromagnetic induction, or a capacitive method.

The components in the image forming apparatus 1 will be described below in detail.

The color image input device 10 includes, for example, a color scanner having a charge coupled device (CCD), reads a reflected light image from a document as an RGB (R: red, G: green, B: blue) analog signal using the CCD, and outputs the analog signal to the color image processing device 20.

The color image processing device 20 generates image data composed of an RGB digital signal (hereinafter, referred to as "RGB signal") by executing image processes described later on the RGB analog signal input from the color image input device 10 by an A/D converter 202, a shading corrector 204, a document type discriminator 206, an ACS determiner 208, an input gradation corrector 210, an area separation processor 212, and a gray-or-monochrome binary determiner 214.

In addition, image processes are executed on the RGB signal output by the gray-or-monochrome binary determiner 214, by a color corrector 216, a black color generation and under color removal device 218, a spatial filter processor 220, an output gradation corrector 224, and a gradation reproduction processor 226 in the color image processing device 20. As a result of the image processes, the color image processing device 20 generates image data composed of CMYK (C: cyan, M: magenta, Y: yellow, K: black) digital signals, and outputs the image data to the color image output device 30 as a stream. The color image processing device 20 may store the generated image data in the storage 60 before outputting the generated image data to the color image output device 30.

The color image output device 30 forms and outputs a color image on a recording sheet (such as a recording paper sheet), based on the image data input from the color image processing device 20, by using a thermal transfer system, an electrophotography system, or an inkjet system. The color image output device 30 functions as an image former in the present embodiment.

The image forming apparatus 1 may include a monochrome image output device that forms and outputs a monochrome image on the recording sheet, instead of the color image output device 30. In this case, color image data is output to the monochrome image output device after being converted to monochrome image data by the color image processing device 20.

Further, the color image processing device 20 converts the RGB signal output from the gray-or-monochrome binary determiner 214 into an RGB signal in the sRGB space by the color corrector 216. The color image processing device 20 executes image processes on the RGB signal by the spatial filter processor 220, a resolution conversion processor 222, the output gradation corrector 224, the gradation reproduction processor 226 (only during output in a monochrome binary mode), and a compression processor 228. The color image processing device 20 generates a compressed file (compressed image data) through the processes described above, and outputs the generated file to the transmission and reception device 40. The color image processing device 20 may store the compressed file in the storage 60 before outputting the compressed file to the transmission and reception device 40.

The transmission and reception device 40 can be connected to a communication network such as a public line network (not illustrated), a Local Area Network (LAN), or the Internet, and transmits the compressed file to the outside via a communication network by a communication method such as facsimile or e-mail. For example, if a Scan to e-mail mode is selected by the user on the operation panel 50, the transmission and reception device 40 formed of a network card, a modem, or the like attaches the compressed file to an e-mail and transmits the compressed file to a set destination.

In facsimile transmission, the controller 70 performs a procedure for communication with the other party, in the transmission and reception device 40 formed of a modem. When it is ensured that the facsimile transmission is enabled, the controller 70 performs a necessary process on the compressed file, such as a process of changing a compression format, and then performs a process of sequentially transmitting the file to the other party via a communication line.

Further, the transmission and reception device 40 may receive a compressed file from another device by a communication method such as facsimile. For example, in facsimile reception, the controller 70 receives a compressed file transmitted from the other party and inputs the received compressed file to the color image processing device 20 while performing a communication procedure in the transmission and reception device 40. The color image processing device 20 performs a decompression process on the received compressed file by a compression and decompression processor (not illustrated). In addition, the color image processing device 20 performs a rotation process, a resolution conversion process, and/or the like on image data of a color image obtained by decompressing the compressed file, by a processing operator (not illustrated), as necessary. Further, the color image processing device 20 performs output gradation correction on the image data by the output gradation corrector 224, and performs a gradation reproduction process by the gradation reproduction processor 226. Thus, the color image processing device 20 performs various image processes on the image data and outputs the processed image data to the color image output device 30.

The color image output device 30 forms an output image on a recording sheet, based on the output image data.

Processing operators in the color image processing device 20 will be described below in detail.

The A/D converter 202 receives an RGB analog signal input from the color image input device 10 to the color image processing device 20, and performs a process of converting the RGB analog signal into an RGB digital signal (that is, an RGB signal). Further, the A/D converter 202 outputs the converted RGB signal to the shading corrector 204.

The shading corrector 204 performs a shading correction process on the RGB signal input from the A/D converter 202. An example of the shading correction performed by the shading corrector 204 includes a process of removing various distortions in the RGB signal generated in an illumination system, an image-formation system, and an imaging system of the color image input device 10. Next, the shading corrector 204 outputs the RGB signal from which the distortions are removed, to the document type discriminator 206.

The document type discriminator 206 performs a document type discrimination process of discriminating the mode of a document such as a character, a photograph, or a photographic paper, using the RGB signal input from the shading corrector 204. Further, the document type discriminator 206 outputs the input RGB signal to the ACS determiner 208. The processing result of the document type discrimination process is reflected in image processes in the subsequent processing operators.

Here, an output mode refers to a color mode applied when image data is output, and is associated with an output method including a setting of a color type and a gradation value used for output.

The ACS determiner 208 performs a process of determining whether to output the image read by the color image input device 10 as a color image including chromatic colors or as a monochrome image not including chromatic colors, based on the RGB signal input from the document type discriminator 206. A well-known method can be employed for the determination process. The ACS determiner 208 outputs the input RGB signal to the input gradation corrector 210.

The input gradation corrector 210 performs a process of correcting the gradation on the input RGB signal. The input gradation corrector 210 performs, for example, processes of adjusting color balance, removing background density, adjusting contrast, and the like for the process of correcting the gradation. Next, the input gradation corrector 210 outputs the processed RGB signal to the area separation processor 212.

The area separation processor 212 performs a process of separating pixels in the image represented by the RGB signal input from the input gradation corrector 210 into one of a character area, a halftone dot area, and a photograph area. Further, the area separation processor 212 outputs, to the black color generation and under color removal device 218, the spatial filter processor 220, and the gradation reproduction processor 226, an area identification signal indicating an area which each of the pixels belongs to, based on the separation result. In addition, the area separation processor 212 outputs the RGB signal input from the input gradation corrector 210 to the gray-or-monochrome binary determiner 214.

The gray-or-monochrome binary determiner 214 performs a process of determining an optimum output mode from among a plurality of output modes that the user can select if it is determined in the ACS determiner 208 that the read image is to be output as a monochrome image, and the image is output to the transmission and reception device 40. The optimum output mode is determined by evaluating the degree of information loss occurring when the image is output in each of the output modes by a method described later.

If the read image is output as image data of a monochrome image, the output modes selectable by the user include the following output modes, for example.

1. Grayscale

In this mode, a color of one pixel is expressed by a 2 bits or more (such as 8 bits) of information amount for the K channel.

2. Monochrome Binary

In this mode, a color of one pixel is expressed by a 1 bit (two gradations) of information amount for the K channel.

In general, as an amount of information for expressing pixels included in image data decreases, the expressiveness reduces. For example, if 8-bit grayscale image data is output as monochrome binary image data, image data expressed in 256 gradations is output as two-gradation monochrome image data, and the halftone pixels become either white or black pixels. As a result, an outline shape of a character image may change, and the character may not be legible (blacked-out characters), or a character or a pattern expressed in halftone may change to white pixels and be invisible (overexposed). Thus, if the number of gradations expressing the image data decreases, the information that could originally be read can no longer be read. Such a case is referred to as "information loss occurs" in the present embodiment.

The gray-or-monochrome binary determiner 214 outputs the input RGB signal to the color corrector 216. Moreover, if it is determined in the ACS determiner 208 that the read image is to be output as a color image, the gray-or-monochrome binary determiner 214 determines "full color" as the optimal output mode. The full color output mode is an output mode in which the color of one pixel is represented by, for example, 8 bits (256 gradations) of information amount for each of the R, G, and B channels. Moreover, even if it is determined in the ACS determiner 208 that the read image is to be output as a monochrome image, then when the read image is to be output to the color image output device 30, the image may always be output as grayscale image data. In this case also, because a halftone process is executed on the image data in the gradation reproduction processor 226 described later, it is not necessary to clearly distinguish whether to output the image data as a grayscale image or as a monochrome binary image.

Further, in the present embodiment, the controller 70 displays a preview screen including information of the output mode determined by the gray-or-monochrome binary determiner 214, on the display 54 of the operation panel 50. When the output mode is confirmed by the user on the preview screen, the controller 70 controls a main image processor 22 to execute the confirmed output mode and output the image data or a compressed file.

The main image processor 22 is a functional element configured by processing operators that execute main image processes. The main image processes refer to a series of processes of generating and outputting image data or a compressed file from an image read by the color image input device 10, in an output mode confirmed by the user. Moreover, the main image processor 22 includes the color corrector 216, the black color generation and under color removal device 218, the spatial filter processor 220, the resolution conversion processor 222, the output gradation corrector 224, the gradation reproduction processor 226, and the compression processor 228.

The color corrector 216 performs a process of correcting a color on the RGB signal input from the gray-or-monochrome binary determiner 214. Here, when image data based on the input RGB signal is output to the color image output device 30, the color corrector 216 converts the RGB signal input from the gray-or-monochrome binary determiner 214 into a CMY digital signal (hereinafter, referred to as "CMY signal"). In addition, the color corrector 216 performs a process of achieving fidelity of color reproduction as a process of reproducing, by a CMY signal converted from the RGB signal, a color represented by a not converted RGB signal. For example, the color corrector 216 performs a process of removing, from the CMY signal, color turbidity based on the spectral characteristics of CMY color materials including an unnecessary absorption component. Next, the color corrector 216 outputs the color-corrected CMY signal to the black color generation and under color removal device 218. On the other hand, when a compressed file based on the input RGB signal is output to the transmission and reception device 40, the color corrector 216 converts the RGB signal input from the gray-or-monochrome binary determiner 214 into a color-corrected RGB signal or a gray signal, and outputs the converted signal to the spatial filter processor 220.

The black color generation and under color removal device 218 performs a black color generation process of generating a black color (K) signal from the CMY signal, based on the CMY signal input from the color corrector 216, and a process of subtracting the K signal obtained from the CMY signal in the black color generation process and generating a new CMY signal. As a result, the CMY digital signal having three colors is converted into a CMYK digital signal having four colors (hereinafter, referred to as "CMYK signal"). Next, the black color generation and under color removal device 218 outputs the CMYK signal obtained by converting the CMY signal, to the spatial filter processor 220.

A method of generating black color by skeleton black is typically employed for the black color generation process. In this method, data C', M', Y', and K' to be output is obtained from input data C, M, and Y. Here, if it is assumed that the input/output characteristics of the skeleton curve are y=f(x), and the Under Color Removal (UCR) rate is α (0<α<1), then in the black color generation and under color removal process, equations represented by the following equations (1) to (4) are used to convert the CMY signal into the CMYK signal.

$$K'=f(\min(C,M,Y)) \quad (1)$$

$$C'=C-\alpha K' \quad (2)$$

$$M'=M-\alpha K' \quad (3)$$

$$Y'=Y-\alpha K' \quad (4)$$

Here, the UCR rate α (0<α<1) indicates how much the CMY is reduced by replacing, with K, a portion where the CMY overlaps. Equation (1) indicates that the K signal is generated according to the smallest signal strength from strengths of the C signal, the M signal, and the Y signal.

The spatial filter processor 220 performs a process of applying a spatial filter to the CMYK signal input from the black color generation and under color removal device 218, or the RGB signal input from the color corrector 216.

When the CMYK signal is input from the black color generation and under color removal device 218, that is, when image data is output to the color image output device 30, the spatial filter processor 220 performs a process of improving image blur or graininess deterioration on the image data of the input CMYK signal. Specifically, the spatial filter processor 220 performs a spatial filter process by a digital filter, based on the area identification signal input from the area separation processor 212, and corrects a spatial frequency characteristic. For example, the spatial filter processor 220 performs a spatial filter process on an area as the character area separated by the area separation processor 212, using a filter with a large enhancement amount of a high-frequency component, to improve the reproducibility of the characters. In addition, the spatial filter processor 220 performs a low-pass filter process of removing an input halftone dot component on an area as the halftone dot area separated by the area separation processor 212. Next, the spatial filter processor 220 outputs the processed CMYK signal to the output gradation corrector 224.

On the other hand, when an RGB signal or a gray signal is input from the color corrector 216, that is, when a compressed file is output to the transmission and reception device 40, the spatial filter processor 220 performs a spatial filter process on the input RGB signal or gray signal. Specifically, the spatial filter processor 220 performs a spatial filter process by a digital filter on the input RGB signal or gray signal, based on the area identification signal input from the area separation processor 212, and corrects the spatial frequency characteristics. Thus, image blur or graininess deterioration is improved. Next, the spatial filter processor 220 outputs the processed RGB signal or gray signal to the resolution conversion processor 222.

The resolution conversion processor 222 performs a resolution conversion process so that the image data has the resolution set on the operation panel 50. For example, if the input resolution of the scanner is 600 DPI×300 DPI and the resolution selected by the user via the operation panel 50 is 300 DPI×300 DPI, the resolution conversion processor 222 determines the average value for every two pixels in the main scanning direction, and sets the value as the output value. Thus, resolution conversion is executed from 600 DPI×300 DPI to 300 DPI×300 DPI. The resolution conversion processor 222 outputs the processed RGB signal or gray signal to the output gradation corrector 224.

The output gradation corrector 224 performs an output gradation correction process on the CMYK signal input from the spatial filter processor 220, based on the characteristic halftone dot area ratio of the color image output device 30. The output gradation corrector 224 outputs the CMYK signal that has been subjected to the output gradation correction process to the gradation reproduction processor 226.

On the other hand, the output gradation corrector 224 performs output gradation correction on the RGB signal or the gray image input from the resolution conversion processor 222 as necessary so that a fog or a background of highlight disappears or is thinner. The output gradation corrector 224 outputs the RGB signal or gray signal that has been subjected to the output gradation correction process to the gradation reproduction processor 226.

When the CMYK signal is input from the output gradation corrector 224, the gradation reproduction processor 226 performs a halftone process on the input CMYK signal in accordance with the area, based on the area identification signal input from the area separation processor 212. For example, the gradation reproduction processor 226 performs a binarization or multilevel conversion process on an area as the character area separated by the area separation processor 212, using a high-resolution screen suitable for reproducing high-frequency components. In addition, the gradation reproduction processor 226 performs a binarization or multilevel conversion process on an area as the halftone dots area separated by the area separation processor 212, using a screen emphasizing gradation reproduction. Next, the gradation reproduction processor 226 outputs image data based on the processed CMYK signal to the color image output device 30.

On the other hand, when the RGB signal or the gray signal is input from the output gradation corrector 224, the gradation reproduction processor 226 performs a binarization process only if a monochrome binary output mode is selected. Next, the output gradation corrector 224 outputs the processed RGB signal or gray signal to the compression processor 228.

The compression processor 228 performs a compression process, if necessary, on the image data including the RGB signal or gray signal input from the output gradation corrector 224, and the monochrome binary signal, in the joint photographic experts group (JPEG) format or in the modified modified read (MMR) format according to the file format settings of the operation panel 50. In addition, the compression processor 228 performs the compression process to generate compressed data, and then generate an image file (compressed file), and outputs to the transmission and reception device 40.

It is noted that the above processes are described as being executed if the controller 70 controls the processing operators, but the above processes may be executed by controlling the processing operators by a computer including a processor such as a digital signal processor (DSP).

Figure 2:
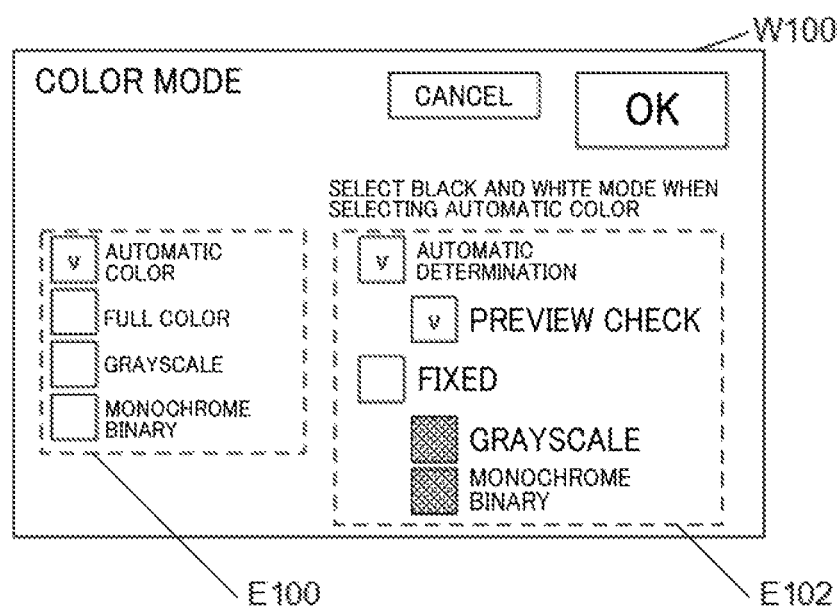
FIG. 2 is a diagram illustrating an example of a screen for selecting an output mode according to the first embodiment.

FIG. 2 is an example of a screen W100 displayed on the display 54 of the operation panel 50 by the controller 70 so that the user selects an output mode on the screen W100. The screen W100 is displayed on the display 54 by the controller 70 before an image on a document or the like is input from the color image input device 10 by the user.

The screen W100 includes an area E100 for selecting an output mode. If selecting an output mode in the area E100, the user outputs all of one or more documents read through a series of scanning operations in the same consolidated output mode (selected among from, for example, "full color", "grayscale", and "monochrome binary").

In addition, the user can select, in the area E100, "automatic color" for changing the output mode for each of the documents instead of outputting the documents in the consolidated output mode. If the user selects the "automatic color", the controller 70 controls the ACS determiner 208 to determine whether to output each of the documents in color or in monochrome, and changes the output mode according to the result.

Further, the screen W100 includes an area E102 for selecting a grayscale output mode or a monochrome binary output mode in which image data of a read document is to be output if the ACS determiner 208 determines that the image data is to be output in monochrome. The area E102 includes a button for designating an output in a consolidated manner in either the grayscale output mode or the monochrome binary output mode, and an "automatic determination" button for determining whether to output the image data in the grayscale output mode or in the monochrome binary output mode.

The user can select "automatic determination" in the area E102 if selecting the "automatic color". If the "automatic determination" is selected, the controller 70 further controls the gray-or-monochrome binary determiner 214 to determine an optimum output mode out of the grayscale output mode and the monochrome binary output mode for the document determined to be output as a monochrome image by the ACS determiner 208. The controller 70 automatically sets the output mode according to the determination result.

Further, when "preview check" is selected in the area E102 by the user, the controller 70 displays, on the display 54 of the operation panel 50, a preview screen including a preview image representing image data obtained when the document is output in an output mode selectable by the user. The preview screen includes a preview image corresponding to at least one or more output modes. If the "preview check" is selected, the controller 70 displays the preview screen regardless of whether the output mode is set manually or automatically as described above. Further, the controller 70 receives an operation of shifting to an output process of the read image or changing the output mode, from the user via the operation processor 52. If the "preview check" is selected, then after the preview screen is displayed on the display 54 until the user confirms the output mode, the controller 70 is in a standby state instead of inputting the image data to the main image processor 22. On the other hand, if the "preview check" is not selected, the controller 70 does not display the preview screen on the display 54, and when an RGB signal is output from the gray-or-monochrome binary determiner 214, the controller 70 inputs the RGB signal to the main image processor 22 without waiting for an input from the user.

Below, in the present embodiment, a case is described where both the "automatic color" and the "automatic determination" are selected by the user through the screen W100 displayed on the display 54 of the operation panel 50, and further, the "preview check" is selected. In this case, the gray-or-monochrome binary determiner 214 further determines which of the grayscale output mode and the monochrome binary output mode of the document is employed to output the read image of a document determined to be output as a monochrome image by the ACS determiner 208. The read image of a document refers to an image read by the color image input device 10.

In addition, if an output mode selected by the gray-or-monochrome binary determiner 214 from among the output modes selectable by the user on the preview screen is selected in advance for an initial value of the selected output mode, the controller 70 presents an appropriate output mode to the user. The controller 70 receives an instruction from the user to change the output mode and to execute an output process.

1.2 Gray-or-Monochrome Binary Determiner

Figure 3:
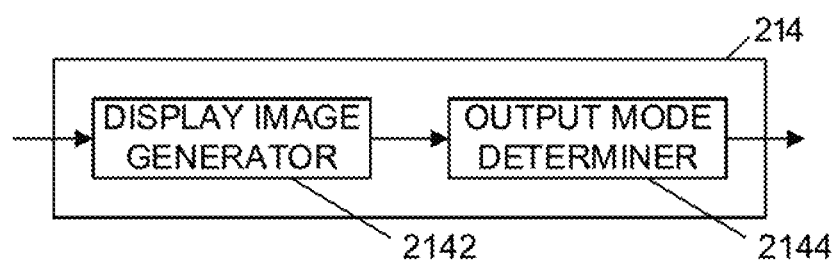
FIG. 3 is a block diagram illustrating a configuration of a gray-or monochrome binary determiner according to the first embodiment.

FIG. 3 is a block diagram illustrating a configuration of the gray-or-monochrome binary determiner 214 according to the present embodiment. The gray-or-monochrome binary determiner 214 receives RGB image data composed of an RGB signal as input, and includes a display image generator 2142 and an output mode determiner 2144.

The processing operators will be described in below detail.

The display image generator 2142 reads an image obtained when a read image is output in at least one or more output modes from among a plurality of output modes selectable by the user, or images obtained by simulating the output modes, for each read image. The display image generator 2142 sets the images that are generated for each read image and correspond to the output modes, as display images. Each of the display images is used as a preview image of the image data output when the selected output mode is executed on the preview screen displayed on the display 54 of the operation panel 50.

It is desirable that the display image generator 2142 generates an image equivalent to that output in the selected output mode, for the display image, but, for this purpose, it is necessary to apply at least some of the main image processes. Thus, the processing time may be long. Further, some or all of the main image processes may be executed by hardware such as an ASIC. Therefore, if an attempt is made to execute processes equivalent to the main image processes to generate the display image, additional design problems such as sharing of the hardware may also occur. Therefore, the display image generator 2142 may not execute the main image processes, but may execute simpler processes as tentative processes, which provide a result relatively close to the main image processes. In the tentative processes, for example, some of the plurality of processes included in the main image processes may be omitted, or a simplified process may be performed, such as reducing the size of a filter applicable in the spatial filter processor 220. Further, the processing amount for generating the display image may be reduced by reducing the input read image in advance, for example. These simplifications can shorten the processing time and save memory required for processes. Even when tentative processes are executed, the display image generator 2142 performs the process of converting an initially input RGB signal into a gray signal.

The above simplification examples may be executed in combination. In addition, these processes may be executed by software, or the tentative processes may be executed by providing hardware different from the hardware executing the main image processes. Such methods enable reduction of the concern that different jobs executed simultaneously by the image forming apparatus 1 are hindered to generate the display image. Further, the display image generator 2142 may execute the main image processes at this stage. Although there are problems such as the processing time and the priority with regard to other jobs executed simultaneously, information loss described later can be evaluated from an image to be actually output to make more accurate determination. In this case, the display image generator 2142 may store the generated display image in the storage 60. Thus, if the output mode corresponding to the display image stored in the storage 60 is selected by the user as the final output mode after the preview screen is displayed, it is possible to output the image with reference to the corresponding display image in the storage 60. That is, the controller 70 can omit some or all of the main image processes, and as a result, an increase in the processing time due to repetition of the same process twice can be prevented.

The output mode determiner 2144 quantitatively evaluates a degree of information loss such as blacked-out characters or overexposure for at least one of the display images generated by the display image generator 2142 if the image is output in the corresponding output mode. A quantitative evaluation method will be described later. The output mode determiner 2144 determines an optimum output mode according to the evaluation result. Thus, the output mode determined based on the evaluation result is referred to as "recommended output mode". When displaying the preview screen on the display 54, the controller 70 displays the preview screen including the information of the recommended output mode to present the recommended output mode to the user. Thus, the information of the recommended output mode can be provided as reference information for the user to select the output mode.

In addition, the output mode determiner 2144 sets the recommended output mode as the initial value of the selected output mode. The selected output mode is an output mode selected as the output mode of image data. The selected output mode can be changed by the user. When the recommended output mode is set as the initial value of the selected output mode, the user can output an image in the optimum output mode determined based on the evaluation result without changing the output mode.

A method of evaluating information loss will be described below for a case where the gray-or-monochrome binary determiner 214 determines whether to output, as a grayscale output or as a monochrome binary output, a read image determined to be output as a monochrome image by the ACS determiner 208.

When the user can select either the grayscale output mode or the monochrome binary output mode, it is typically conceivable that the monochrome binary output mode is more likely to cause information loss due to blacked-out characters or overexposures. A method of quantitatively evaluating the information loss occurring when the image is output in the monochrome binary output mode will be described below.

Figure 4:
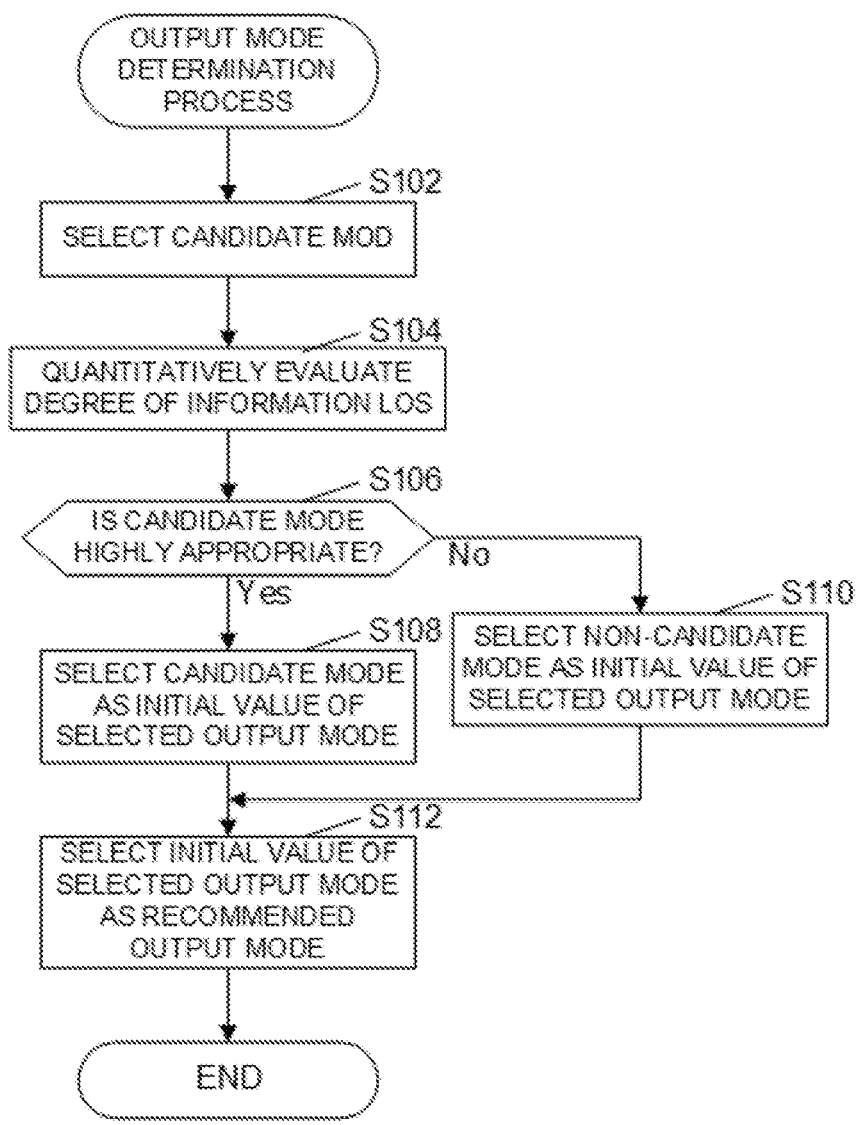
FIG. 4 is a flowchart illustrating a flow of an output mode determination process according to the first embodiment.

FIG. 4 is a diagram illustrating a processing flow of an output mode determination process in which the output mode determiner 2144 quantitatively evaluates a degree of information loss for each of read images, and determines an optimum output mode from among the output modes selectable by the user. In the output mode determination process, a process of setting the determined optimum output mode as the initial value of the selected output mode, and as the recommended output mode is also executed.

Firstly, the output mode determiner 2144 selects one output mode as a candidate mode from among the output modes selectable by the user (step S102). In the present embodiment, the output mode determiner 2144 selects, as a candidate mode, the monochrome binary output mode in which information loss is more likely to occur, to quantitatively evaluate information loss with regarding the candidate mode as a provisional selected output mode.

Next, the output mode determiner 2144 quantitatively evaluates the degree of information loss occurring when the read image is output in the candidate mode (step S104), and determines the appropriateness of outputting the image in the candidate mode, from the evaluation result of the information loss (step S106). For example, when an evaluation value is calculated such that the value increases as the degree of information loss increases, the evaluation value is compared with a threshold value, and if the evaluation value is equal to or smaller than the threshold value, it is determined that the appropriateness of outputting the image in the candidate mode is high. That is, if a small degree of information loss occurs when the image is output in the candidate mode, the output mode determiner 2144 determines that the candidate mode is an appropriate output mode and that the appropriateness of outputting the image in the candidate mode is high. On the other hand, if the evaluation value is larger than the threshold value, it is determined that the appropriateness of outputting the image in the candidate mode is low. That is, if a large degree of information loss occurs when the image is output in the candidate mode, the output mode determiner 2144 determines that the candidate mode is not an appropriate output mode and that the appropriateness of outputting the image in the candidate mode is low. A method described below can be employed for the quantitative evaluation method and the method of evaluating the appropriateness.

If determining that the appropriateness of outputting the image in the candidate mode is high, the output mode determiner 2144 selects the output mode selected as the candidate mode (indicating the monochrome binary output mode in this case), as the initial value of the selected output mode of the read image (step S106; Yes to step S108). On the other hand, if determining that the appropriateness of outputting the image in the candidate mode is low, the output mode determiner 2144 selects the other output mode (a non-candidate mode; indicating the grayscale output mode in this case) not selected as the candidate mode, as the initial value of the selected output mode of the read image (step S106; No to step S110). At the same time, the output mode determiner 2144 selects the output mode set as the initial value of the selected output mode for each of the read images, as the recommended output mode for each of the read images (step S112). The output mode determiner 2144 executes the above-described processes on all the images read by the color image input device 10, and selects the initial value of the selected output mode and the recommended output mode for each of the read images.

For a specific method of quantitatively evaluating the degree of information loss, for example, a case where an output mode in which the degree of information loss is to be quantitatively evaluated is set as a target mode (here, the monochrome binary output mode), and an output mode being a comparison target is set as a reference mode (here, the grayscale output mode) will be described. Here, information loss occurring when the image is output in the target mode is quantitatively evaluated as follows.

Firstly, the output mode determiner 2144 calculates a spatial edge amount for each pixel of a display image corresponding to the target mode (hereinafter, referred to as "target image"), and generates a target edge image. Similarly, the output mode determiner 2144 generates a reference edge image having a spatial edge amount for each pixel of a display image corresponding to the reference mode (hereinafter, referred to as "reference image") as well. For example, a method of calculating the spatial edge amount by applying a high-pass filter such as a Sobel filter for each pixel may be employed.

Next, the output mode determiner 2144 calculates, for each pixel, a lost edge amount being an edge amount lost when the image is output in the target mode. To obtain the lost edge amount, for example, if a method is applied in which the target edge image is subtracted from the reference edge image for each pixel, and a negative number is changed to zero, only the edge amount lost in the target edge image can be taken into consideration.

The output mode determiner 2144 calculates an evaluation value taking a larger value as the degree of information loss increases, by using the lost edge amounts in some or all of pixels of the image. To obtain the evaluation value, for example, the sum of the lost edge amounts corresponding to some or all of pixels of the image may be used as the evaluation value of the target image, or the lost edge amount may be compared with a predetermined threshold value for each pixel, and the count of the number of pixels having an edge amount equal to or greater than the threshold value may be used as the evaluation value. In addition, a statistical lost edge amount may be calculated for each area (pixel block) including a plurality of pixels included in the image and compared with a threshold value, and the number of areas satisfying the condition may be calculated as the evaluation value, or if the areas satisfying the conditions are detected in continuation, then a value corresponding to the continuous number of areas may be calculated as the evaluation value.

The statistical lost edge amount for each area may employ a variance of the lost edge amount or an entropy value, for example.

The output mode determiner 2144 compares the evaluation value calculated by the above method with a predetermined threshold value, and if the evaluation value is larger than the predetermined threshold value, the output mode determiner 2144 determines that the appropriateness of outputting the image in the target mode is low because the degree of information loss occurring when the image is output in the target mode is large. In addition, when the evaluation value is equal to or smaller than the predetermined threshold value, the output mode determiner 2144 determines that the appropriateness of outputting the image in the target mode is high because the degree of information loss occurring when the image is output in the target mode is small. The threshold value to be compared with the evaluation value may be predetermined, or may be set by the user. For example, if the threshold value is set by the user, the determination criteria for the recommended output mode changes. In this case, the grayscale output mode can be easily determined as the recommended output mode if the user sets a small threshold value.

1.3 Display of Preview Screen

When the output mode determiner 2144 sets the initial value of the selected output mode and the recommended output mode for each of the read images, the controller 70 displays a preview screen on the display 54 of the operation panel 50. The preview screen includes a preview image of each of the images read by the color image input device 10. In the present embodiment, the description is based on the fact that the controller 70 displays the display image generated by the display image generator 2142 as a preview image. An example of the layout of the preview screen displayed on the display 54 by the controller 70 will be described below.

1.3.1 Example 1 of Layout of Preview Screen: Single Page (1)

Figure 5:
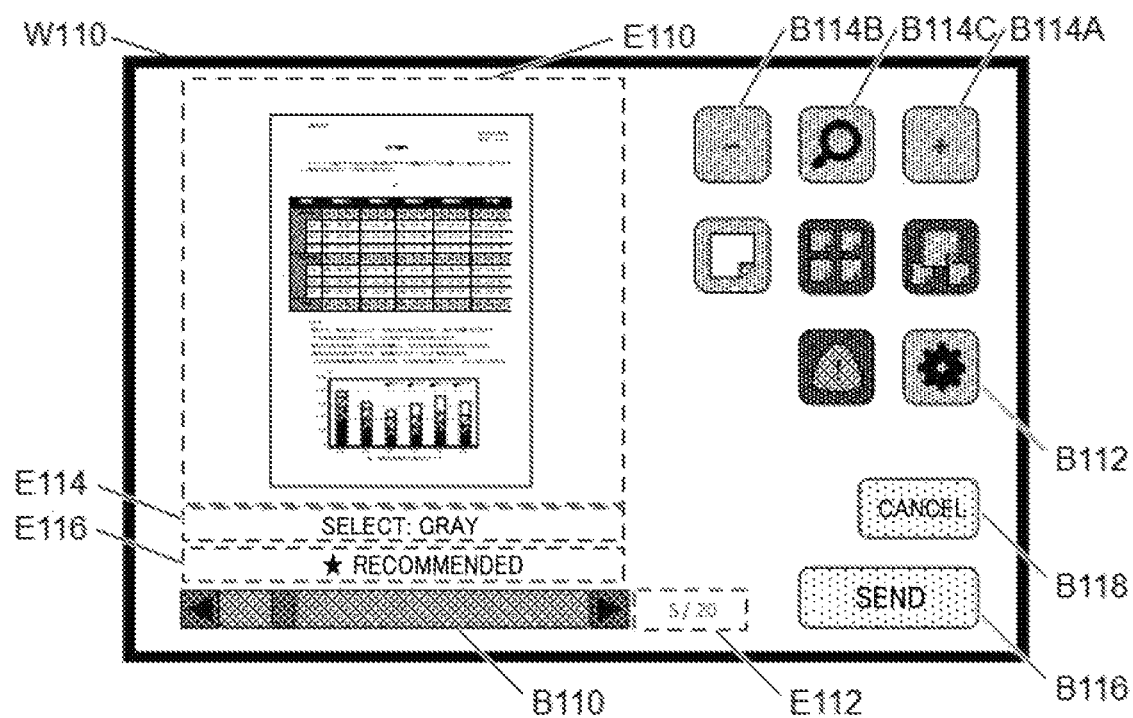
FIG. 5 is a diagram illustrating a screen example of a preview screen according to the first embodiment.

FIG. 5 is a diagram illustrating an example of a preview screen displayed on the display 54 of the operation panel 50 by the controller 70. A preview screen W110 includes a preview area E110 for displaying a display image being a prediction of an output result when the currently selected page is output in the selected output mode among the read images in one or more pages. Further, the preview screen W110 includes changers such as buttons with which various operations are executed through a touch operation on the screen. The user can execute various operations by touching the changers via the operation processor 52. The controller 70 changes the content displayed on preview screen W110, based on a user operation input via the operation processor 52.

Examples of the various operations may include the following changers.

A page changer that changes a page of the display image displayed on the preview screen An output mode changer that changes an output mode for the read image on the page corresponding to the display image being displayed A display magnification changer that changes a display magnification of the display image A display range changer that shifts and changes a range to be cut out when the display magnification of the display image is large, and thus, only a part of the display image is cut out and displayed A confirmer that gives an instruction to output a read image according to the set selected output mode A canceler that cancels output of the read image In the case of FIG. 5, the user operates a scroll bar B110 serving as a page changer to select a desired page, and touches a setting change button B112 serving as an output mode changer to change an output mode to a desired output mode. The user touches an enlarge button B114*a* or a reduce button B114*b* serving as a display magnification changer to gradually increase or decrease the display magnification. The user touches a button B114*c* for changing the magnification to any magnification and enters a desired magnification to change the display magnification to the entered display magnification.

The display range may be shifted and changed according to the change amount of the scroll bars by operating, for example, the horizontal and vertical scroll bars serving as the display range changer. Further, the user touches a confirmation button (transmission button) B116 serving as the confirmer to confirm a selected output mode for each page at that stage as the final output mode and provide an instruction for shifting to the main image processor 22. The user touches a cancel button B118 serving as the canceler to discard all read images and cancel an image output process.

FIG. 5 is an example for executing the components for the operations described above, and it is not always necessary to employ the above-described operation method and screen configuration. For example, graphic or arrangement different from that in FIG. 5 may be employed, or a certain touch gesture may be recognized on the operation panel 50, and thus, an operation corresponding to the touch gesture may be executed. In an example of operations corresponding to a gesture, it is possible to change a display range along a movement of a finger of a user moving from a state where the finger of the user touches a display image without releasing the finger from the screen.

It is noted that the changers described above are similarly included in a layout example of the preview screens described later.

In the preview area E110, a display image corresponding to the selected output mode of the currently selected page is displayed. Further, an area E112 for displaying a page number corresponding to the display image being displayed, an area E114 for displaying the selected output mode, and an area E116 for displaying information indicating whether the selected output mode matches a recommended output mode are displayed. The selected output mode of each page and the information indicating whether the selected output mode matches a recommended output mode may be indicated with a text or may be indicated with a graphic, an icon, or the like as illustrated in FIG. 5. In the example of FIG. 5, the fact that the selected output mode matches a recommended output mode is indicated by displaying the characters "Recommended".

In the present embodiment, because the initial value of the selected output mode of each page matches a recommended output mode, the selected output mode always matches a recommended output mode immediately after the preview screen is displayed. However, for example, if the output mode changer (for example, the setting change button B112) is operated by the user to change the selected output mode, a state changes in which the output mode matches or does not match the recommended output mode. As a result, a case may occur where the recommended output mode and the selected output mode do not match. If the recommended output mode and the selected output mode do not match, the controller 70 deletes the display of "Recommended" from the area E116, or displays information (such as characters of "Not recommended output mode") indicating that the recommended output mode and the selected output mode do not match. Thus, immediately after the preview screen is displayed, information indicating that the selected output mode matches the recommended output mode is displayed in the area E116. However, if the selected output mode is changed, the content to be displayed in the area E116 changes. Therefore, after the user changes the selected output mode, for example, when checking the content displayed in the area E116, the user can know whether the selected output mode matches the recommended output mode.

1.3.2 Example 2 of Layout of Preview Screen: Single Page (2)

Figure 6:
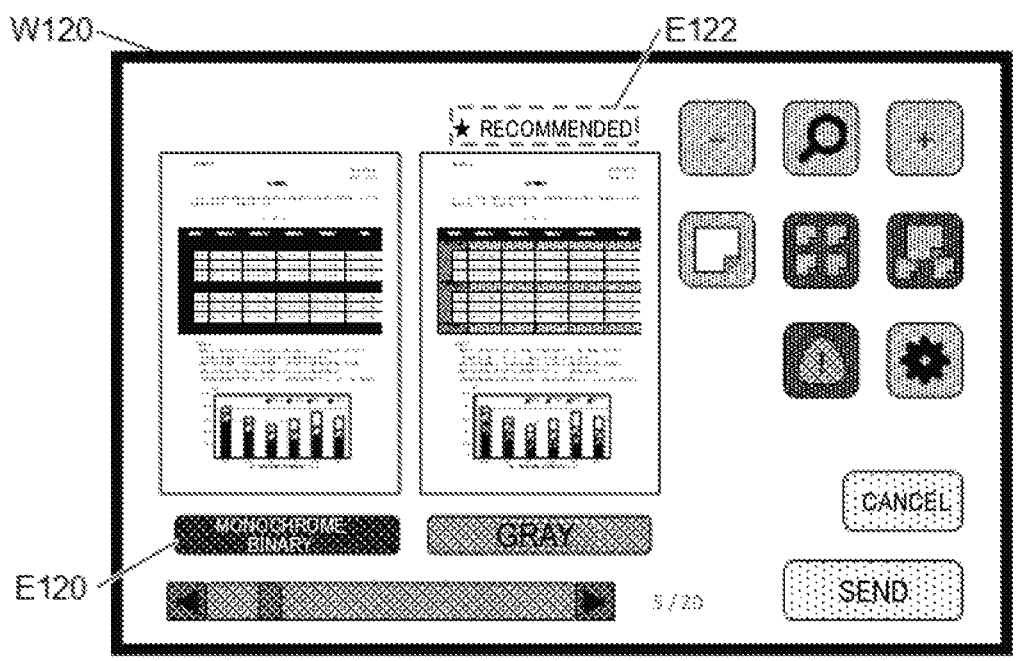
FIG. 6 is a diagram illustrating a screen example of a preview screen according to the first embodiment.

FIG. 6 is a diagram illustrating a preview screen W120 being another example of the preview screen displayed on the display 54 of the operation panel 50 by the controller 70. The difference from the example illustrated in FIG. 5 is that a display image corresponding to the selected output mode of each page at that time is displayed in FIG. 5, whereas display images corresponding to a plurality of output modes are displayed side by side in FIG. 6.

In this case, if one of the plurality of display images displayed side by side corresponds to the selected output mode, the controller 70 displays information indicating that the display image corresponds to the selected output mode, on the display 54. Further, if one of the plurality of display images corresponds to the recommended output mode, the controller 70 displays information indicating that the display image corresponds to the recommended output mode, on the display 54.

For example, as illustrated in FIG. 6, the controller 70 displays a plurality of display images side by side on the display 54 and displays the name of the output mode below each of the display images. In addition, as illustrated in the area E120, if the output mode corresponding to the display image matches the selected output mode, the controller 70 highlights the name of the output mode to indicate that the display image corresponds to the selected output mode. Further, the controller 70 displays information indicating whether the output mode corresponding to the display image matches the recommended output mode. For example, as illustrated in an area E122 in FIG. 6, when the output mode corresponding to the display image matches the recommended output mode, information (such as characters "Recommended") indicating that the output mode matches the recommended output mode is displayed.

Thus, the user can compare at a glance how an output in the selected output mode or the recommended output mode looks differently from an output in another output mode. Therefore, the user can more intuitively determine whether to output the image in the selected output mode or to change the output mode to another output mode for outputting the image.

An example of a method of changing the selected output mode includes a method of touching the setting change icon B112 on the preview screen to call a menu for changing the setting. Alternatively, for example, the user may touch each of the display images or information indicating the output mode corresponding to the display image to select the output mode corresponding to the display image as the selected output mode.

In addition, a display switching instructor may be further provided on the display 54 of the operation panel 50, and thus, the controller 70 may be able to switch the output mode of the display image displayed on the preview screen. For example, when the display of the preview screen is started, the controller 70 always includes the selected output mode as an initial value for the display image displayed on the preview screen. If an output mode other than the selected output mode is selected by the user through the display switching instructor, the controller 70 displays a display image corresponding to the selected output mode on the preview screen.

As illustrated in FIG. 6, while display images corresponding to a plurality of output modes are being displayed on the preview screen, the display magnification changer or the display range changer may be operated by the user. In such a case, it is desirable that the controller 70 applies a process of changing the display magnification or the display range executed on one display image to another display image as well. If the changes in the display magnification and the display range are also executed on the other display image, it is possible to simultaneously confirm how differently a portion to be focused upon by the user is viewed among a plurality of output modes.

1.3.3 Example 3 of Layout of Preview Screen: Successive Pages Display

Figure 7:
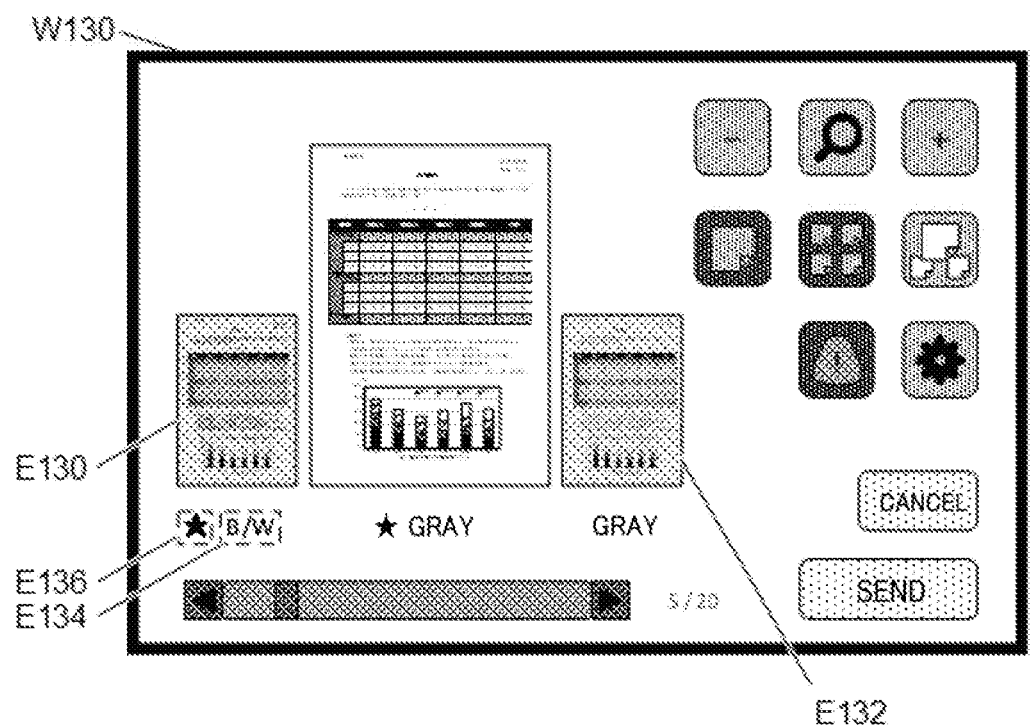
FIG. 7 is a diagram illustrating a screen example of a preview screen according to the first embodiment.

FIG. 7 is a diagram illustrating yet another example of a preview screen displayed on the display 54 of the operation panel 50 by the controller 70. Compared to the examples illustrated in FIG. 5 and FIG. 6, in FIG. 5 and FIG. 6, the display image of the read image corresponding only to the currently selected page is displayed. On the other hand, as for a preview screen W130 illustrated in FIG. 7, display images are also displayed for the read images corresponding to the pages before and after the currently selected page in addition to the currently selected page.

The controller 70 displays the read images corresponding to the pages before and after the selected page (referred to as "previous page image" and "next page image", respectively), around the selected page. Specifically, the controller 70 arranges and displays the display images side by side on the left and right sides of the read image corresponding to the selected page, or above and below the read image corresponding to the selected page. For example, as illustrated in FIG. 7, the controller 70 displays the previous page image in an area E130 on the left side of the read image corresponding to the selected page, and displays the next page image in an area E132 on the right side of the read image corresponding to the selected page.

The controller 70 may display the display images corresponding to the previous page image and the next page image in a form different from that of the display image corresponding to the selected page. For example, the controller 70 may display the display images corresponding to the previous page image and the next page image in size smaller than the display image corresponding to the selected page as illustrated in FIG. 7. With such methods, it is possible to make it easy to visually recognize the display image corresponding to the selected page among the plurality of displayed pages.

When the recommended output mode is determined for each page, the controller 70 may display a character string or draw a graphic indicating whether the corresponding recommended output mode and the selected output mode match for each of the display images of the plurality of displayed pages. For example, as illustrated in FIG. 7, an area E134 displaying information (such as characters "B/W" indicating the monochrome binary output mode) indicating the selected output mode of the previous page image is included in the preview screen W130. Further, an area E136 for displaying a symbol indicating whether the selected output mode matches the recommended output mode is included next to the area E134. The controller 70 also displays information indicating the selected output mode and a symbol indicating whether the selected output mode matches the recommended output mode for the image corresponding to the selected page and the next page image. When such a display is provided, the user can easily check how the selected output mode changes/continues among successive pages, and how much the selected output mode matches or does not match the recommended output mode.

1.3.4 Example 4 of Layout of Preview Screen: List (Index) Display

Figure 8:
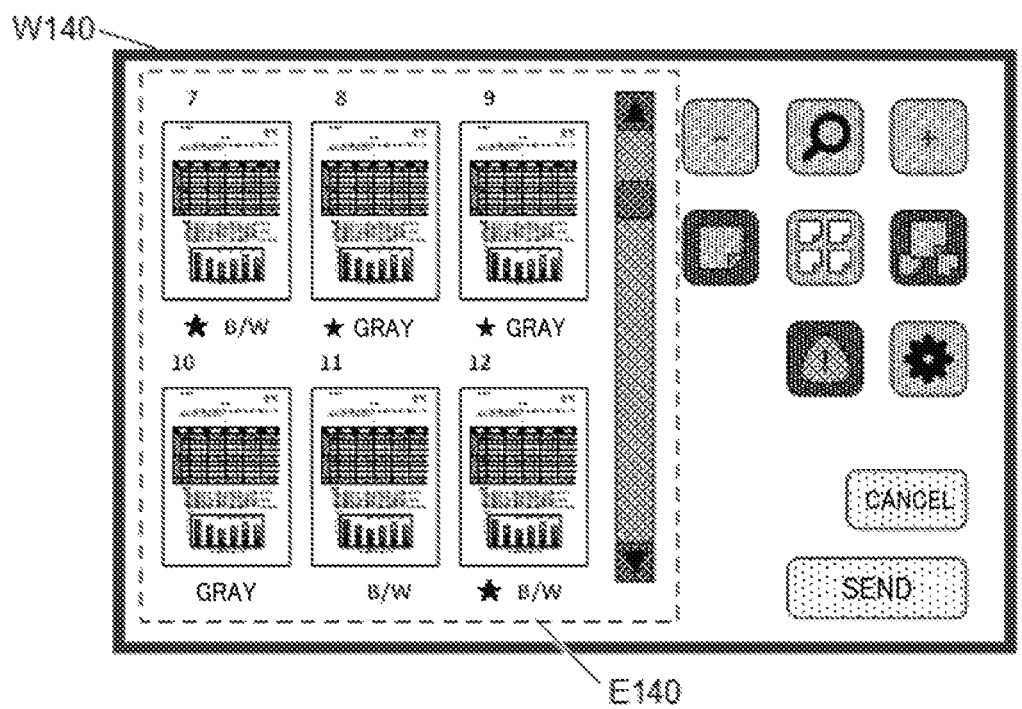
FIG. 8 is a diagram illustrating a screen example of a preview screen according to the first embodiment.

FIG. 8 is a diagram illustrating still yet another example of a preview screen displayed on the display 54 of the operation panel 50 by the controller 70. Compared to FIG. 7, in FIG. 7, the display images of the currently selected page and the pages before and after the currently selected page are displayed. On the other hand, a preview screen W140 illustrated in FIG. 8 arranges side by side and displays, in an index format, thumbnails created by reducing each of display images included in a partial range of a plurality of read pages. For example, as illustrated in an area E140 of FIG. 8, if image data of a plurality of pages is input, the controller 70 arranges side by side and displays display images of the image data of some of the plurality of pages (display images of the 7th to 12th pages in the example in FIG. 8). Further, the controller 70 displays information indicating the selected output mode and a symbol indicating whether the selected output mode matches the recommended output mode, below each of the display images.

There is no particular limitation on a display image used for creating a thumbnail. However, it is difficult to determine whether information loss that can be visually recognized by the user on the preview screen is caused by converting into the monochrome binary format or by the reduction process. Therefore, to make it easy to identify the original contents of the page even if reduced, it is desirable to create the thumbnail from a display page corresponding to an output mode (the gray scale output mode in this example) in which information loss from an input image is assumed to be the least. As illustrated in FIG. 8, a character string or a graphic indicating the most recently selected output mode corresponding to each of the pages may be drawn. Similarly, a character string or a graphic indicating the recommended output mode corresponding to each of the pages may be drawn. When such character strings or graphics are drawn, it is possible to intuitively check how much the selected output mode or the recommended output mode is identical (or varies) in a series of documents.

1.3.5 Change in Layout of Preview Screen

The controller 70 may include a layout changer that changes the layout of the preview screen according to an operation input via the operation processor 52. The controller 70 displays a display image in accordance with a layout corresponding to the option selected by the user from at least two or more layout options including the above-described layout. However, it is obvious that the layout may be limited to a single preview screen layout without any layout changer. For example, if only the preview screen is displayed in the index format as illustrated in FIG. 8 and is not switched to a preview screen in another format, the display magnification changer and the display range changer can be omitted.

An example is described above in which either one of the grayscale output mode and the monochrome binary output mode which are a selectable output mode is determined as the recommended output mode, and changes are accepted on the preview screen. Thus, it is possible to determine an optimum output method and the appropriateness thereof for an image obtained by reading a document, and to visualize information necessary for prompting a user to determine an output mode (output method) to be executed.

According to the present embodiment, it is possible to prompt a user to determine an output mode by displaying, on the preview screen, a predicted image obtained when read image data is output in an optimum output mode selected automatically for the read image data, along with information indicating that the optimum output mode is a recommended output mode. Therefore, it is possible to provide information used for the user to determine whether to change an output mode.

2. Second Embodiment

Next, a second embodiment will be described. In the second embodiment, an example will be described in which, if there are three or more output modes selectable by a user, one recommended output mode is selected (determined) from the output modes. The second embodiment is an embodiment in which both the "automatic color" and the "automatic determination" are selected through the operation panel 50, and the "preview check" is further selected. Unlike the first embodiment, in the present embodiment, for a read image of a document determined to be output as a monochrome image by the ACS determiner 208, an initial value of a selected output mode of the document is further selected automatically from N (N>2) output modes. Specifically, an output mode in which the appropriateness of outputting the document is high is selected from N (N>2) output modes including a first output mode, a second output mode, . . . and an N-th output mode in descending order of the degree of information loss. It is noted that the description of portions having the same configuration as that of the first embodiment will be omitted.

2.1 Determination Process

A method of evaluating the appropriateness of outputting the document in an output mode sequentially from the first output mode, among from among N output modes selectable by the user will be described below.

Figure 9:
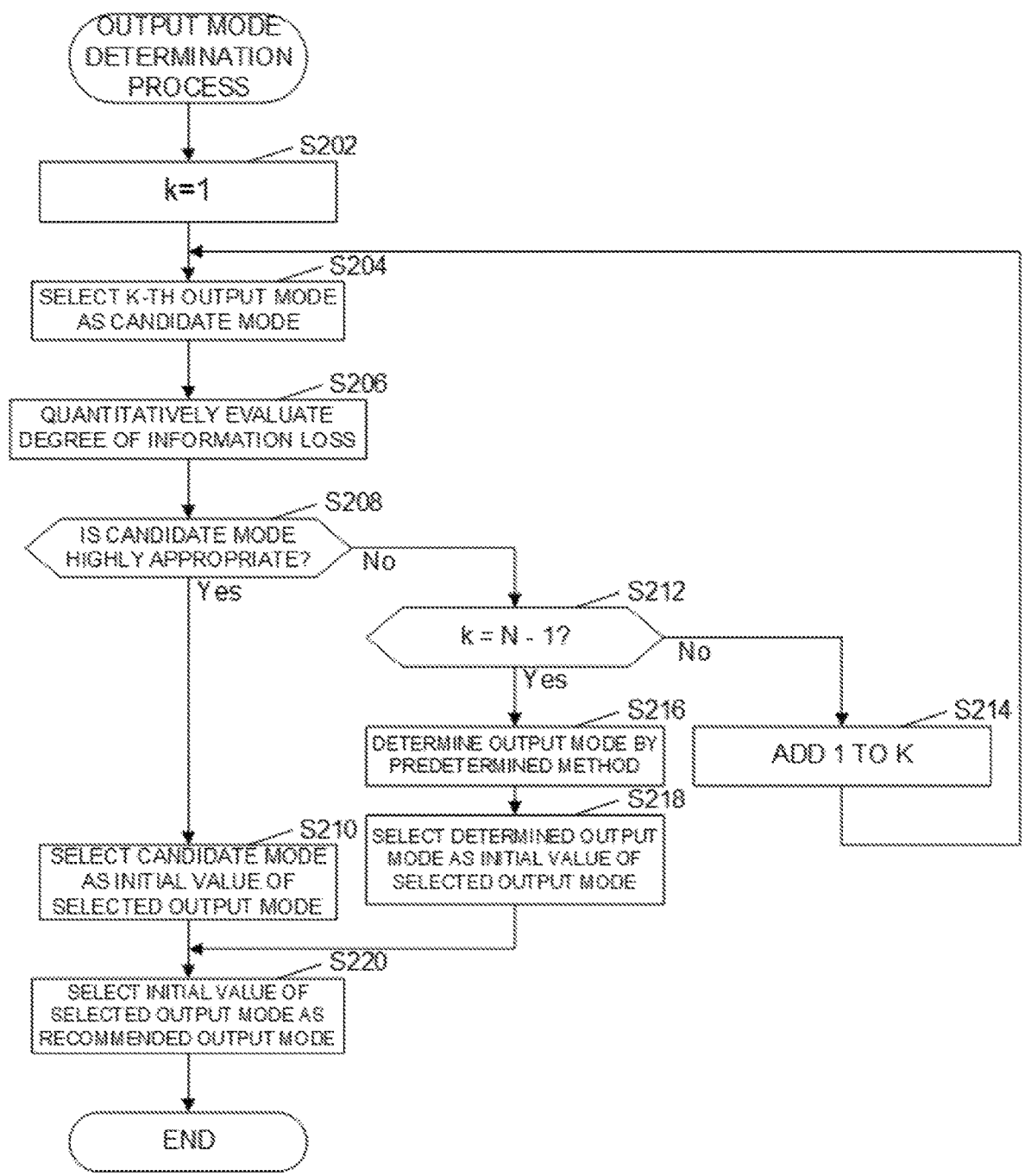
FIG. 9 is a flowchart illustrating a flow of an output mode determination process according to a second embodiment.

FIG. 9 is a diagram illustrating a processing flow of an output mode determination process in which the output mode determiner 2144 quantitatively evaluates the degree of information loss for each read image, and determines an appropriate output mode. Firstly, the output mode determiner 2144 selects a k-th output mode as a candidate mode with k=1 (step S202 to step S204). Next, the output mode determiner 2144 quantitatively evaluates the degree of information loss occurring when the read image is output in the k-th output mode to calculate an evaluation value $E_k$ (step S206). The output mode determiner 2144 evaluates the appropriateness of outputting the image in the k-th output mode by comparing the evaluation value $E_k$ with a threshold value $T_k$ (step S208). The appropriateness is evaluated, for example, by a method similar to that in step S106 of the first embodiment.

If it is determined that the appropriateness of outputting the image in the k-th output mode is high, the output mode determiner 2144 determines the k-th output mode as the optimum output mode, and selects the k-th output mode as the initial value of the selected output mode of the read image (step S208; Yes to step S210). On the other hand, if it is determined that the appropriateness of outputting the image in the k-th output mode is low, and k=N−1 is not established, that is, k is smaller than N−1, the output mode determiner 2144 adds 1 to k (step S208; No to step S212; No to step S214). If k is smaller than N−1, there are remained two or more selectable output modes, and thus, the processing returns to step S204.

The output mode determiner 2144 repeats the series of processing until the initial value of the selected output mode is set, or until k=N−1 is satisfied, and if k=N−1 is satisfied, the output mode determiner 2144 determines the optimum mode by a predetermined method (step S212; Yes to step S216). The output mode determiner 2144 selects the optimum output mode determined in step S216 as the initial value of the selected output mode (step S218). In the predetermined method, for example, the N-th output mode is unconditionally determined as the optimum output mode. Alternatively, the appropriateness of the output is evaluated for the N-th output mode as well, and if the appropriateness is high, the N-th output mode is determined as the optimum output mode. On the other hand, if the appropriateness is low, the output mode with the highest appropriateness among the selectable N output modes may be determined as the optimum output mode.

Further, the output mode determiner 2144 selects the initial value of the selected output mode selected in step S210 or step S218 as the recommended output mode (step S220).

It is noted that the quantitative evaluation method and the method of evaluating the appropriateness may be the above-described methods, or an evaluation method may be switched for each of the output modes. In particular, the method of calculating the information loss in the k-th output mode in comparison with the display image in the N-th output mode cannot be used as a quantitative evaluation method in the N-th output mode, and therefore, for example, in the N-th output mode, the evaluation value $E_N$ may be calculated based on the output file size. Thus, for example, if the upper limit of the file size that can be received by e-mail is not sufficiently large, it is possible to prevent output of the image in the N-th output mode if the upper limit is exceeded, by setting a threshold value based on the upper-limit file size.

It is noted that if the quantitative evaluation method is thus changed for each of the output modes, it is difficult to make a comparison if there is a variation in the range of evaluation values or threshold values. Therefore, for example, the threshold values may be unified to the same value (such as 1.0), and a method of calculating an evaluation value may be adopted such that when the evaluation value is smaller than the threshold value, the output mode is determined to have appropriateness.

Figure 10:
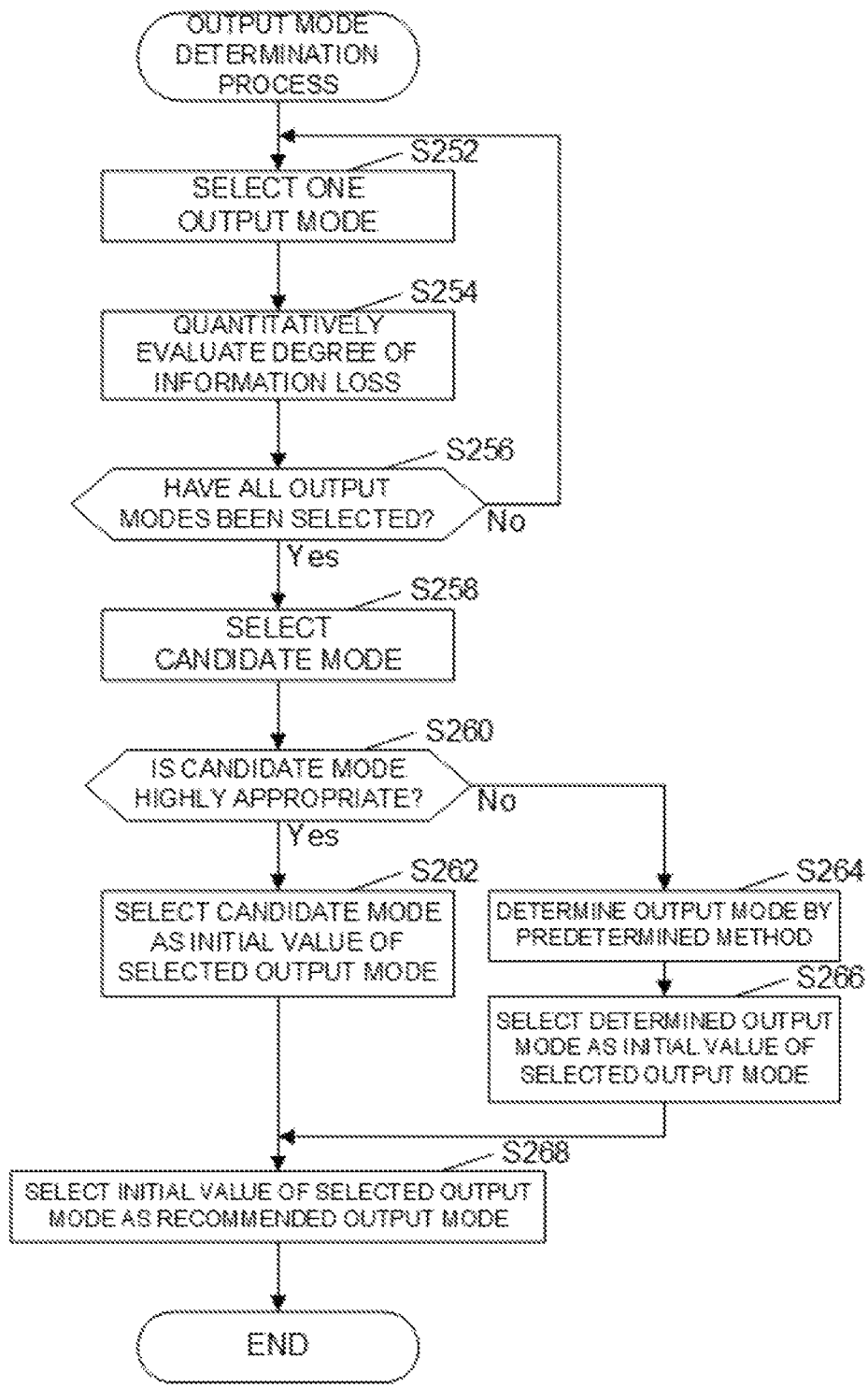
FIG. 10 is a flowchart illustrating a flow of an output mode determination process according to the second embodiment.

FIG. 10 is a diagram illustrating another method of determining an appropriate output mode from N selectable output modes and selecting one as an initial value of the selected output mode. A difference from FIG. 9 is that in FIG. 9, the appropriateness is determined one by one for each of the output modes, and when an output mode is determined to have appropriateness, the output mode is determined as the selected output mode and the determination loop is ended; however, in FIG. 10, firstly the evaluation values are calculated for all the output modes. The output mode having the highest appropriateness is selected as a candidate mode, and the appropriateness of outputting the image in the candidate mode is determined. However, if the evaluation value exceeds a threshold value for any of the output modes, a predetermined output mode is selected as the initial value of the selected output mode. For the predetermined output mode, for example, the N-th output mode in which information loss from the input image is least likely to occur may be selected, or the user or an administrator may manually set an output mode through a menu or the like.

Specifically, the output mode determiner 2144 selects one output mode from the output modes selectable by the user, quantitatively evaluates the degree of information loss occurring when the image is output in the selected output mode, and calculates an evaluation value (step S252 to step S254). Subsequently, the output mode determiner 2144 determines whether all of the output modes selectable by the user are selected (step S256). If all of the output modes selectable by the user are not selected, the processing returns to step S252 (step S256; No to step S252).

If all of the output modes selectable by the user are selected, the output mode determiner 2144 selects the output mode having the highest appropriateness for an output mode as the candidate mode based on the evaluation value (step S256; Yes to step S258). Subsequently, the output mode determiner 2144 evaluates the appropriateness of outputting the image in the candidate mode from the evaluation result of information loss occurring when the image is output in the candidate mode (step S260). The appropriateness is evaluated, for example, by a method similar to that in step S106 of the first embodiment.

If it is determined that the appropriateness of outputting the image in the candidate mode is high, the output mode determiner 2144 determines that the output mode selected as the candidate mode is the optimum output mode, and selects the output mode as the initial value of the selected output mode of the read image (step S260; Yes to step S262). On the other hand, if it is determined that the appropriateness of outputting the image in the candidate mode is low, the output mode determiner 2144 determines the optimum output mode by a predetermined method (step S260; No to step S264). The process of determining the optimum output mode by a predetermined method, and selecting the optimum output mode as the initial value of the selected output mode may be performed, for example, by performing a process similar to the process in step S214. The output mode determiner 2144 selects the determined optimum output mode as the initial value of the selected output mode (step S266). Further, the output mode determiner 2144 selects the initial value of the selected output mode selected in step S262 or step S266 as the recommended output mode (step S268).

In an example of the N output modes, for example, if three types (N=3) of output modes, that is, a monochrome binary output mode, a j-bit (1<j<8) grayscale output mode, and an 8-bit grayscale output mode are selectable, then the three modes can be sequentially considered as a first output mode, a second output mode, and a third output mode.

2.2 Modification of Determination Process

A method is described above in which corresponding display images are generated in advance for all of the N>2) selectable output modes, and the initial value of the selected output mode is selected. The method described above is effective if the storage 60 has areas sufficient to store N display images, and it is possible to execute the process of generating display images in the display image generator 2142 and the determination process in the output mode determiner 2144 at a sufficiently high speed. However, if the storage 60 provided in the image forming apparatus 1 according to the present embodiment does not have sufficient areas, it may be difficult to store the N display images. Further, an enormous time may be required for the process of generating the N display images and the determination process in the output mode determiner 2144. In this case, the waiting time of the user may increase to impair convenience.

In addition, some users may wish that the output mode is selected only from a few major output modes among the N output modes.

Therefore, a method of narrowing down the N selectable output modes to M (2≤M<N) output modes to determine the initial value of the selected output mode will be described below. If M=2, the output mode determiner 2144 determines an optimum output mode for the M selectable output modes according to the flow in FIG. 4, and selects an initial value of the selected output mode. If M>2, the output mode determiner 2144 determines an optimum output mode for the M selectable output modes according to the flow in FIG. 9 or FIG. 10, and selects an initial value of the selected output mode.

In this case also, the controller 70 displays corresponding display images even for the N–M output modes not included in the M selectable output modes on the preview screen, or selects the output mode as the selected output mode. If the user selects that the display image is to be displayed for one or more output modes from the remaining N–M output modes, the display image generator 2142 generates a display image corresponding to the selected output mode. Further, the display image generator 2142 stores the generated display image in the storage 60. The controller 70 displays a preview screen including the display image stored in the storage 60 on the display 54. If the storage 60 has no remaining storage areas for storing the newly generated display image, the display image generator 2142 sequentially erases and overwrites a display image in ascending priority from among the already-stored display images. Here, the priority is the highest for display images displayed on the display 54, followed by a display image corresponding to the most recently selected output mode, and then the display image corresponding to a recommended output mode. In addition, for a display image not corresponding to any of the above, for example, as a time is more immediate when the display image is displayed last, the priority is higher.

According to the present embodiment, if there are many output mode options, it is possible to reduce a waiting time of the user and make it easier to select a representative output mode, with minimum operations.

3. Third Embodiment

In the first embodiment and the second embodiment, a method of displaying the preview screen, based on the display image generated by the display image generator 2142 and the initial value of the selected output mode automatically determined by the output mode determiner 2144 is described. The user can determine to change the selected output mode or to shift to an output process, through the preview screen. The present embodiment is an embodiment in which portions of a document where information loss is likely to occur are clearly indicated to the user when the document is output in the selected output mode. It is noted that the description of portions having the same configuration as that of the first embodiment and the second embodiment will be omitted.

The output mode determiner 2144 according to the present embodiment uses a lost edge amount calculated between a target image and a reference image by the above-described method to identify a location where information loss is likely to occur in the entire target image, in addition to calculating an evaluation value and determining the appropriateness. The process of identifying a location where information loss is likely to occur is performed, for example, in steps S104, S206, and S254.

In a method of identifying a location, for example, when a statistical amount is calculated for each area having a predetermined size and including a plurality of pixels, for quantitative evaluation, areas formed as one block by adjoining areas where the statistical amount exceeds a threshold value is extracted as one object. The output mode determiner 2144 uses the number of areas constituting the object, or the like as a score for determining whether the area is a location where information loss is likely to occur, and if the score is above a threshold value, the output mode determiner 2144 identifies the area as a location where information loss is likely to occur. A threshold value to be compared with the statistical amount or the score may be predetermined, or may be set by the user.

Typically, if information loss is large, an information loss evaluation value expressed as a differential value being a gradation value of differential image data calculated between the target image and the reference image or an absolute value of the differential value tends to be large as a whole. Therefore, it is possible to use a statistical value reflecting the overall magnitude of the gradation value, for the statistical amount. Specifically, it is possible to use a sum (total value), an average value, a median value, and the like of the gradation value of each of pixels of the entire differential image data. If information loss is large, the information loss evaluation value expressed as a differential value being a gradation value or a variation in the differential value as a whole tends to be large. Therefore, it is possible to use a statistical value reflecting the magnitude of the variation in the gradation value, for the statistical amount. Specifically, it is possible to use a variance value, a standard deviation value, and entropy value and the like of the gradation value of each of pixels of the entire differential image data. It is noted that the method of identifying a location is not limited to the above-described method of calculating a statistical amount for each area, and a method of calculating a statistical amount for each pixel may be employed.

Figure 11A:
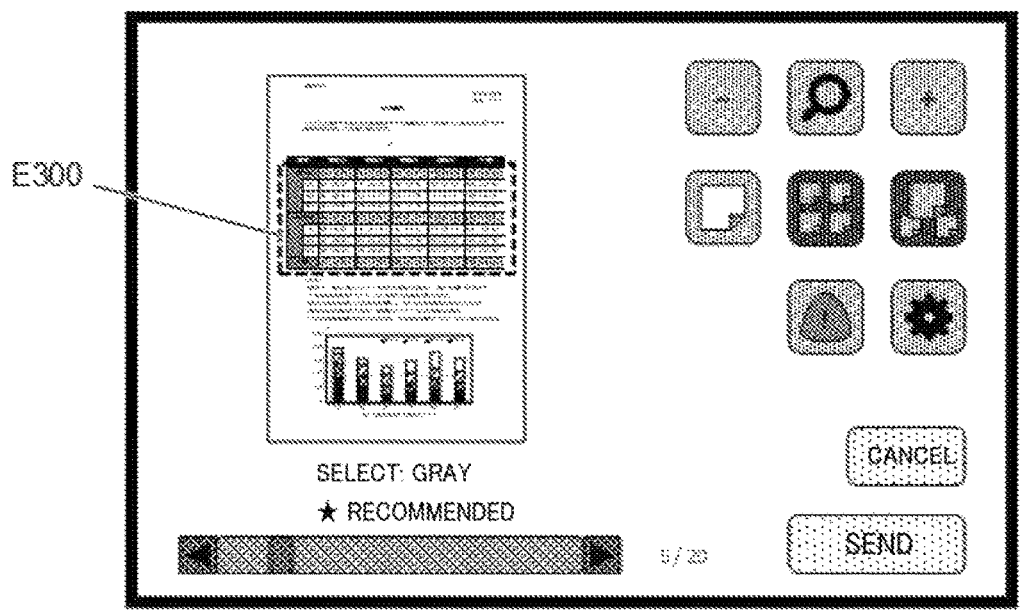
FIGS. 11A and 11B are diagrams illustrating a screen example of a preview screen according to a third embodiment.
Figure 11B:
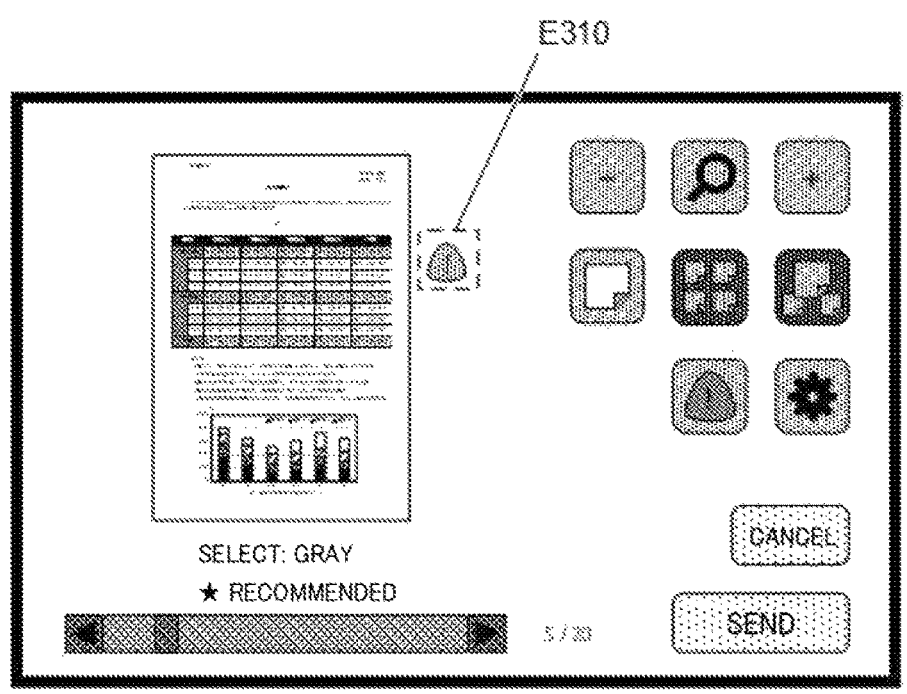

When the output mode determiner 2144 identifies a location in the target image where information loss is likely to occur, the controller 70 highlights the identified location from among the display images displayed, on the display 54 of the operation panel 50 to be easily viewed by the user. FIGS. 11A and 11B are diagrams illustrating an example in which the identified location is highlighted on the preview screen. In a method of highlighting the identified location, for example, the controller 70 directly draws a rectangle or another graphic on the display image to superimpose a range corresponding to the identified location to highlight the identified location. FIG. 11A is a display example in which a location where information loss is likely to occur is indicated by a rectangle E300. Further, for example, the controller 70 draws a graphic such as an arrow or a sign indicating the above location at a position near the above location on the outer periphery of the display image to highlights the above location. FIG. 11B is a display example in which an icon E310 is displayed at a position near a location where information loss is likely to occur. If viewing the rectangle E300 and the icon E310, the user can confirm a location where information loss is likely to occur.

Figure 12:
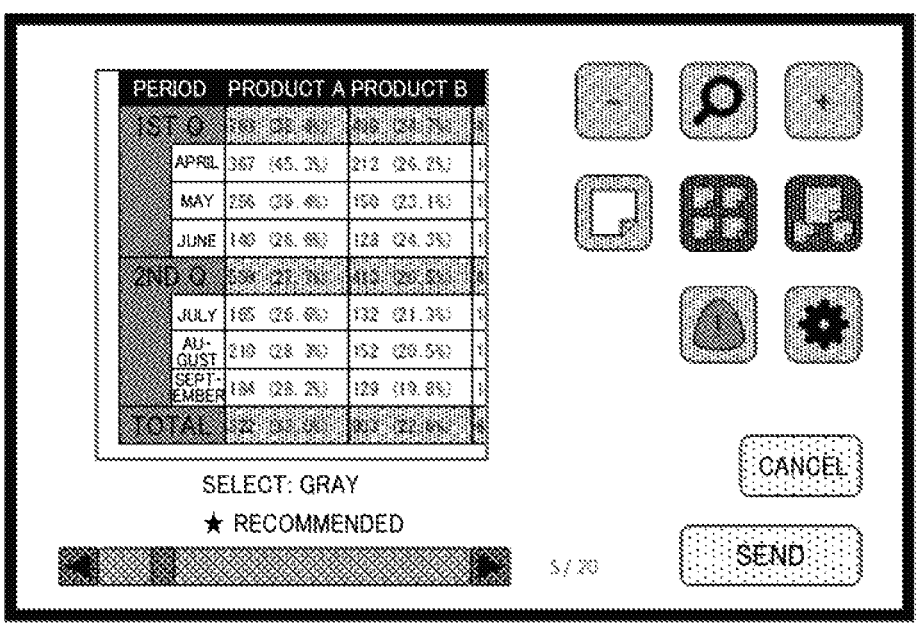
FIG. 12 is a diagram illustrating a screen example of a preview screen according to the third embodiment.

In addition, if an operation such as a touch operation is performed by the user on the drawn graphics, the controller 70 automatically adjusts the display magnification and the display range so that a location corresponding to each of the graphics is enlarged and displayed, as illustrated in FIG. 12. Thus, the user can confirm, by a more intuitive operation, the details of a portion determined as a location where information loss is likely to occur.

Figure 13A:
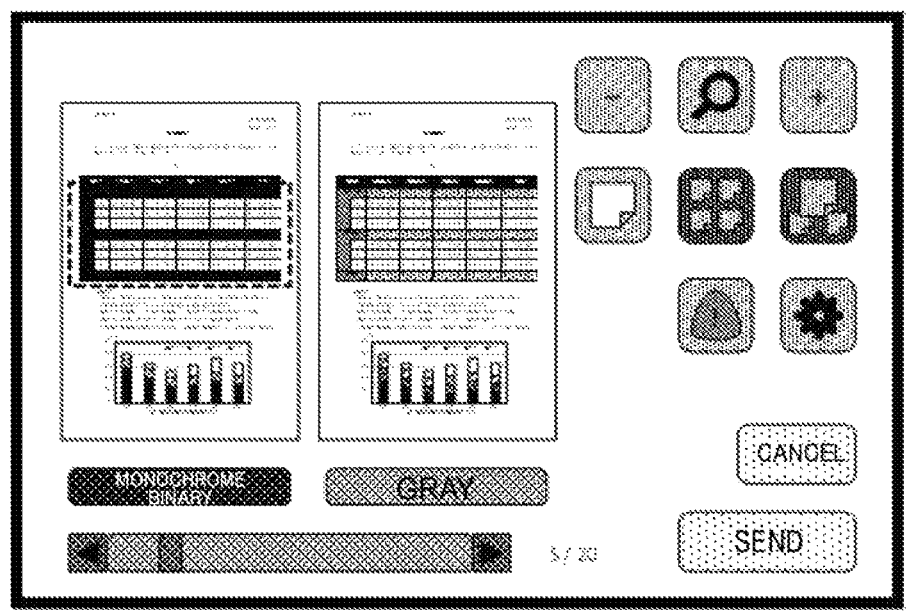
FIGS. 13A and 13B are diagrams illustrating a screen example of a preview screen according to the third embodiment.
Figure 13B:
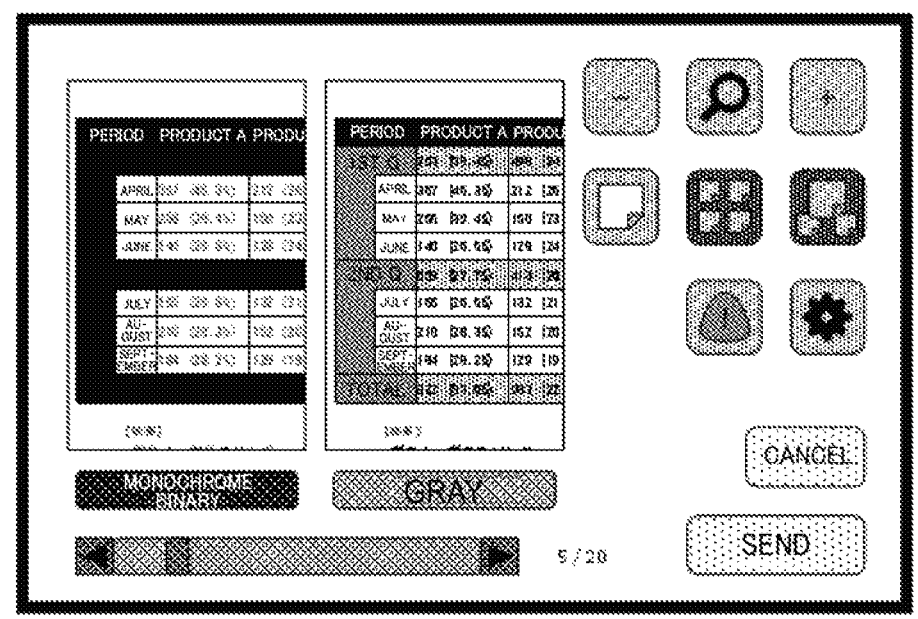

FIGS. 13A and 13B illustrate a screen example in which the controller 70 displays a preview screen on the display 54 when a layout for displaying the display images corresponding to a plurality of output modes is employed, as illustrated in FIG. 6. FIG. 13A is an example in which an identified location where information loss is likely to occur is highlighted on each of the display image. FIG. 13B is a diagram illustrating an example in which the identified location is enlarged and displayed by a user operation. If a layout as illustrated in FIG. 13A is employed, after adjusting the display magnification and the display range in correspondence to the user operations on graphics on one of the display images, the controller 70 adjusts the same on another display image displayed. Thus, a screen on which the user can confirm the locations while comparing the same locations is displayed on the display 54, as in the example illustrated in FIG. 13B. Therefore, the user can determine the degree of information loss more intuitively. As illustrated in FIG. 11A, even if the identified locations are highlighted by graphics on a single display image, the controller 70 may arrange side by side and display the identified locations where information loss is likely to occur, same as in FIG. 13B. For example, only when an identified location is enlarged through a user operation on a graphic, the controller 70 equivalently adjusts the display magnification and display range even for the display images corresponding to an output mode different from the target output mode. The controller 70 displays the partially enlarged images thus generated, side by side, for the different output mode.

According to the present embodiment, the degree of information loss that may occur when the read image data is output in each of the output modes is quantified, the appropriateness of outputting the data in the output mode is evaluated, and a location where information loss is likely to occur is identified. It is possible to highlight the location in the display image.

4. Fourth Embodiment

In the third embodiment, an example is described in which both the "automatic color" and the "automatic determination" through the operation panel 50 are selected, and one of the selectable output modes is determined as the recommended output mode. In the present embodiment, even if an output mode is manually selected by the user, whether the appropriateness of outputting the image in the output mode is high is determined from an evaluation value based on a magnitude of a degree of information loss, and then the determination result is presented to the user on the preview screen.

The present embodiment is an embodiment where the user selects a specific output mode without selecting the "automatic color" through the operation panel 50, or where the user selects the "automatic color", but does not select the "automatic determination", and monochrome output is determined by the ACS determiner 208. In this context, a case where a specific output mode is selected as the output mode will be described. It is noted that the description of portions having the same configuration as that of the first embodiment through the third embodiment will be omitted.

In the present embodiment, the output mode selected by the user via the operation processor 52 of the operation panel 50 is set as the initial value of the selected output mode, and the display image generator 2142 generates at least the display image corresponding to the output mode selected by the user. The output mode determiner 2144 calculates an evaluation value obtained when the image is output in the output mode selected by the user, and evaluates the appropriateness of outputting the image in the output mode selected by the user through comparison of the evaluation value with a threshold value. However, in the present embodiment, even if it is determined that the appropriateness of outputting the image in the output mode selected by the user is low, the output mode determiner 2144 does not reselect another output mode as the selected output mode.

The output mode determiner 2144 may refer to a display image corresponding to another output mode to calculate the evaluation value obtained when the image is output in the output mode selected by the user. In such a case, the display image generator 2142 also generates a corresponding display image in the output mode required by the output mode determiner 2144.

Figure 14:
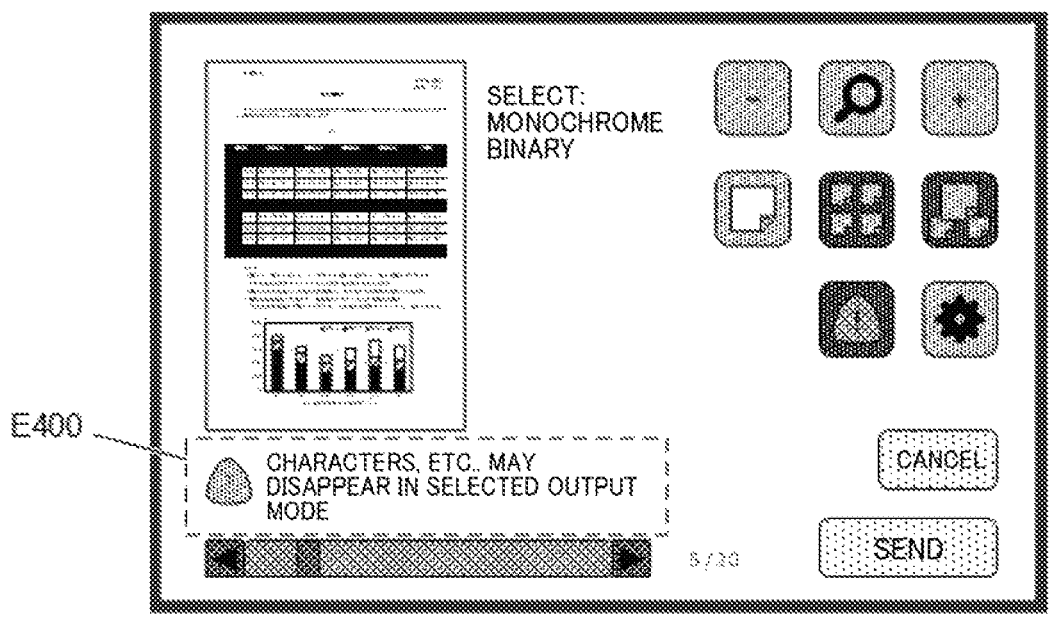
FIG. 14 is a diagram illustrating a screen example of a preview screen according to a fourth embodiment.

FIG. 14 is a diagram illustrating an example of a preview screen displayed on the display 54 of the operation panel 50 by the controller 70. In addition to displaying a display image corresponding to the most recently selected output mode on the preview screen, the controller 70 displays information according to the appropriateness of outputting the image in the selected output mode. In displaying information according to the appropriateness described above, for example, the controller 70 may display a warning by using character strings or graphics (or both thereof) for problems such as the possibility of occurrence of information loss when the image is output in the selected output mode if it is determined that the appropriateness of outputting the image in the selected output mode is low. On the other hand, if it is determined that the appropriateness is high, the controller 70 does not display anything (clears the warning display). For example, as illustrated in an area E400 in FIG. 14, the controller 70 displays an icon together with a warning message such as "Characters, etc., may disappear in selected output mode". When such a warning is displayed, the user can determine whether to output the image as is in the selected output mode, or to change the selected output mode to another output mode, by referring to the display and the warning of the display image corresponding to the currently selected output mode.

Although not illustrated, the above-described location where information loss is likely to occur may be detected by the output mode determiner 2144, and the controller 70 may simultaneously highlight the location where information loss is likely to occur in the display image. This makes it easier for the user to more intuitively determine whether to output the image as is in the selected output mode or to change the output mode.

5. Fifth Embodiment

In the first to fourth embodiments, a configuration is described in which the image processing device according to the present invention is applied to the image processing device included in the image forming apparatus 1, but the present invention is not limited thereto. Therefore, in the present embodiment, an example will be described in which an image processing device including the display image generator 2142, the output mode determiner 2144, the operation processor 52, the display 54, and the main image processor 22 is applied to an image processing device included in an image reading device such as a flatbed scanner.

Figure 15:
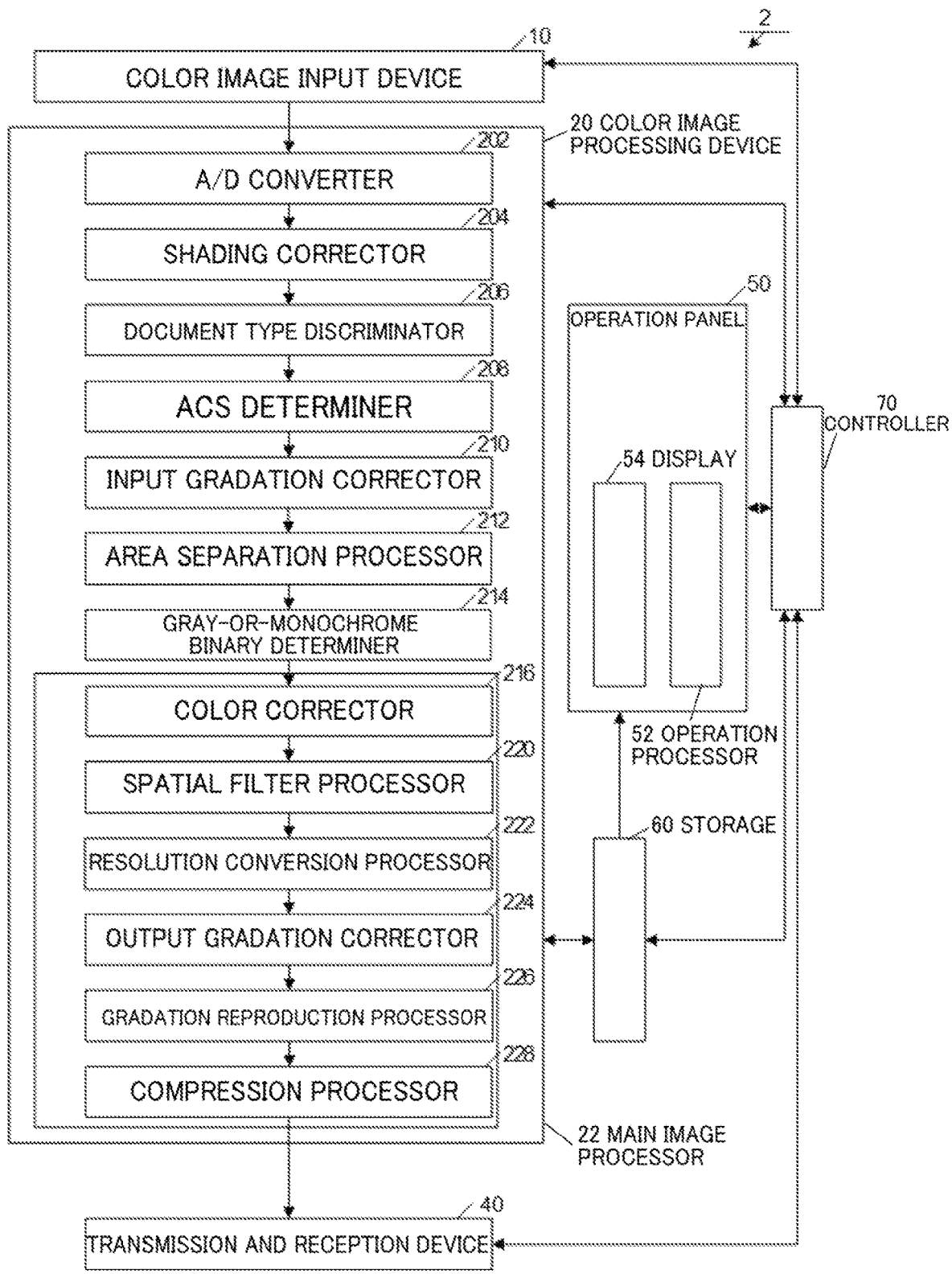
FIG. 15 is a diagram for explaining a functional configuration of an image reading device according to a fifth embodiment.

FIG. 15 is a block diagram illustrating a configuration of the image reading device 2 including the image processing device according to the present embodiment. As illustrated in FIG. 15, the image reading device 2 includes the color image input device 10, the color image processing device 20, the transmission and reception device 40, the operation panel 50, the storage 60, and the controller 70. The color image processing device 20 includes the A/D converter 202, the shading corrector 204, the document type discriminator 206, the ACS determiner 208, the input gradation corrector 210, the area separation processor 212, the gray-or-monochrome binary determiner 214, and the main image processor 22. The main image processor 22 includes the color corrector 216, the spatial filter processor 220, the resolution conversion processor 222, the output gradation corrector 224, the gradation reproduction processor 226, and the compression processor 228. The gray-or-monochrome binary determiner 214 and the operation panel 50 execute a process of determining the number of output gradations of a monochrome image similarly to the process in the first embodiment.

Various processes executed by the image reading device are controlled by the controller 70 (a computer including a processor such as a central processing unit (CPU) or a digital signal processor (DSP)) provided in the image reading device.

In the present embodiment, the image reading device 2 is not limited to a scanner, and may be, for example, a digital still camera, a document camera, or an electronic device equipped with a camera (such as a mobile phone, a smartphone, and a tablet device).

6. Sixth Embodiment

The above-described image processing device and server device may be implemented by a logic circuit (hardware) formed on an integrated circuit (IC chip) or the like, or may be implemented by software using a central processing unit (CPU).

In the latter case, the image processing device and the server device are provided with a CPU that executes instructions of a program being software for realizing functions, a read only memory (ROM) or a storage device (referred to as "recording media") in which the program and various data are recorded in a format readable by a computer (or the CPU), a random access memory (RAM) for developing the program, and the like. The computer (or the CPU) reads the program from the recording medium and executes the program, thereby achieving the object of the present invention. Examples of the recording medium include "non-transitory tangible media" such as a tape, a disk, a card, a semiconductor memory, and a programmable logic circuit. Further, the program may be supplied to the computer via any transmission medium (such as a communication network and a broadcast wave) capable of transmitting the program. The present embodiment may also be realized in the form of a data signal embedded in a carrier wave, in which the program is embodied by electronic transmission.

The image processing device is configured to handle color image data. However, the present invention is not limited thereto, and the image processing device may be configured to handle monochrome image data.

7. Modification

The present invention is not limited to the above embodiments, and can have various modifications. That is, embodiments obtained by combining technical means appropriately changed within the scope not departing from the gist of the present invention are also included in the technical scope of the present invention.

The image processing device may be realized by a computer. In this case, a program for causing a computer to realize the image processing device by operating the computer as each of the components for the operations described above, and a computer-readable recording medium for recording the program are also included in the scope of the present invention.

In addition, if the program is distributed to a market, the program stored in a portable recording medium may be distributed, or the program may be transferred to a server computer connected via a network such as the Internet. In this case, of course, a storage device of the server computer is also included in the present invention.

DESCRIPTION OF REFERENCE NUMERALS

1: Image forming apparatus
10: Color image input device
20: Color image processing device
  202: A/D converter
  204: Shading corrector
  206: Document type discriminator
  208: ACS determiner
  210: Input gradation corrector
  212: Area separation processor
  214: gray-or-monochrome binary determiner
  216: Color corrector
  218: Black color generation and under color removal device
  220: Spatial filter processor
  222: Resolution conversion processor
  224: Output gradation corrector
  226: Gradation reproduction processor
  228: Compression processor
30: Color image output device
40: Transmission and reception device
50: Operation panel
  52: Operation processor
  54: Display
60: Storage
70: Controller
2: Image reading device

What is claimed is:

1. An image processing device comprising:
a generator that generates output image data from input image data;
a calculation processor that calculates a lost edge amount for each pixel losing from outputting image data in an unselected reference mode by outputting image data in a preselected target mode and an evaluation value indicating a degree of information loss of the output image data using the calculated lost edge amount; and
a determiner that compares the evaluation value with a predetermined threshold value and determines a magnitude of the degree of information loss,
wherein the generator executes an output mode in accordance with a determination result by the determiner and generates output image data.

2. The image processing device according to claim 1, further comprising: a display that displays information in accordance with the determination result by the determiner, wherein the display displays information indicating that it is appropriate to output the output image data if the determination result indicates that the degree of information loss is small.

3. The image processing device according to claim 2, wherein the display displays a warning on the display if the determination result indicates that the degree of information loss is large.

4. The image processing device according to claim 2, wherein the display displays a warning on the display if the determination result indicates that the degree of information loss is large.

5. The image processing device according to claim 2, wherein the generator executes at least one output mode of a first output mode for generating first gradation image data and a second output mode for generating second gradation image data to generate output image data from the input image data.

6. The image processing device according to claim 5, wherein the generator executes the output mode specified by a user to generate output image data.

7. The image processing device according to claim 5, wherein the display displays one or a plurality of the output image data on the display, and displays information according to a determination result by the determiner for the one or a plurality of the output image data displayed.

8. The image processing device according to claim 5, wherein if there are a plurality of the input image data, a plurality of the output image data corresponding to the plurality of the input image data are displayed side by side for each of the plurality of the input image data, and information according to a determination result by the determiner is displayed for the plurality of the output image data displayed.

9. The image processing device according to claim 2, further comprising: an identifier that identifies an area in which information loss occurs, based on a statistical amount for each of areas having a predetermined size and constituting the output image data, wherein
the display displays the output image data and highlights the area identified by the identifier.

10. The image processing device according to claim 1, wherein the calculation processor generates respectively a target edge image having a spatial edge amount for each pixel of the target image corresponding to the target mode and a reference edge image having the spatial edge amount for each pixel of a reference image corresponding to the reference mode.

11. The image processing device according to claim 1, wherein the calculation processor subtracts a target edge image from a reference edge image for each pixel, changes a negative number to zero, and calculates only the edge amount lost in the target edge image.

12. A control method, comprising:
generating output image data from input image data;
calculating a lost edge amount for each pixel losing from outputting image data in an unselected reference mode by outputting image data in a preselected target mode and an evaluation value indicating a degree of information loss of the output image data using the calculated lost edge amount;
comparing the evaluation value with a predetermined threshold value and determining a magnitude of the degree of information loss; and
executing an output mode according to a determination result in the comparing and determining.

13. A computer-readable non-transitory recording medium that records a program causing a computer to execute functions of:

generating output image data from input image data;

calculating a lost edge amount for each pixel losing from outputting image data in an unselected reference mode by outputting image data in a preselected target mode and an evaluation value indicating a degree of information loss of the output image data using the calculated lost edge amount;

comparing the evaluation value with a predetermined threshold value and determining a magnitude of the degree of information loss; and executing an output mode according to a determination result in the comparison and determination.

* * * * *